(12) United States Patent
Nakamura et al.

(10) Patent No.: US 10,001,781 B2
(45) Date of Patent: Jun. 19, 2018

(54) TRAVEL CONTROL DEVICE AND TRAVEL CONTROL METHOD

(71) Applicant: Nissan Motor Co., Ltd., Yokohama-Shi, Kanagawa (JP)

(72) Inventors: Masahide Nakamura, Kanagawa (JP); Tsuneyuki Watanabe, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days. days.

(21) Appl. No.: 15/505,324

(22) PCT Filed: Aug. 28, 2014

(86) PCT No.: PCT/JP2014/072551
§ 371 (c)(1),
(2) Date: Feb. 21, 2017

(87) PCT Pub. No.: WO2016/031011
PCT Pub. Date: Mar. 3, 2016

(65) Prior Publication Data
US 2017/0269602 A1    Sep. 21, 2017

(51) Int. Cl.
*B60W 30/16* (2012.01)
*G05D 1/02* (2006.01)
(Continued)

(52) U.S. Cl.
CPC ....... *G05D 1/0214* (2013.01); *B60W 30/0956* (2013.01); *B60W 30/16* (2013.01);
(Continued)

(58) Field of Classification Search
CPC .................................................. G05D 1/0214
See application file for complete search history.

(56) References Cited

U.S. PATENT DOCUMENTS 9,598,075 B2 * 3/2017 Makino ............... B60W 10/184
9,796,378 B2 * 10/2017 Tsuruta ................. B60W 30/00
(Continued)

FOREIGN PATENT DOCUMENTS

EP    2042962 A1    4/2009
EP    2253522 A1    11/2010
(Continued)

*Primary Examiner* — Truc M Do
(74) *Attorney, Agent, or Firm* — Young Basile Hanlon & MacFarlane, P.C.

(57) ABSTRACT

A travel control device executes an acquisition function to acquire object information including the position of an avoidance object which a subject vehicle should avoid, a planning function to plan a target route for the subject vehicle in accordance with the position of the avoidance object, and a control function to output command information for driving the subject vehicle on the target route. The planning function is used to specify a plurality of avoidance objects that are located within a predetermined distance from the subject vehicle and exist in the same lane adjacent to a lane in which the subject vehicle travels and to set a lateral position of the target route along the width direction of a road on which the subject vehicle is traveling. The lateral position of the target route is planned so as to avoid the avoidance objects.

16 Claims, 15 Drawing Sheets

(51) Int. Cl.
*B60W 30/095* (2012.01)
*G01C 21/34* (2006.01)

(52) U.S. Cl.
CPC ..... *G01C 21/3492* (2013.01); *B60W 2420/52* (2013.01); *B60W 2550/10* (2013.01)

(56) References Cited

U.S. PATENT DOCUMENTS

| | | | |
|---|---|---|---|
| 9,809,164 B2 * | 11/2017 | Matsuno | B60Q 9/00 |
| 9,809,219 B2 * | 11/2017 | Agnew | B60W 30/09 |
| 2004/0193374 A1 * | 9/2004 | Hac | B60K 31/0008 |
| | | | 701/301 |
| 2005/0125155 A1 | 6/2005 | Kudo | |
| 2008/0208408 A1 * | 8/2008 | Arbitmann | B60W 10/06 |
| | | | 701/41 |
| 2009/0088966 A1 | 4/2009 | Yokoyama et al. | |
| 2011/0022317 A1 | 1/2011 | Okita | |
| 2012/0010808 A1 | 1/2012 | Yokoyama et al. | |
| 2012/0072050 A1 | 3/2012 | Naka | |
| 2012/0306634 A1 * | 12/2012 | Tsuda | B60Q 1/2611 |
| | | | 340/425.5 |
| 2013/0197758 A1 * | 8/2013 | Ueda | G05D 1/0088 |
| | | | 701/41 |
| 2014/0032015 A1 * | 1/2014 | Chun | G08G 1/166 |
| | | | 701/2 |
| 2014/0032049 A1 * | 1/2014 | Moshchuk | B62D 15/0265 |
| | | | 701/42 |
| 2015/0224987 A1 | 8/2015 | Tachibana | |
| 2015/0224988 A1 | 8/2015 | Buerkle et al. | |

FOREIGN PATENT DOCUMENTS

| | | |
|---|---|---|
| JP | 2001272236 A | 10/2001 |
| JP | 2003044994 A | 2/2003 |
| JP | 2005173663 A | 6/2005 |
| JP | 2010274837 A | 12/2010 |
| JP | 2013043563 A | 3/2013 |
| JP | 2013091401 A | 5/2013 |
| JP | 2013154710 A | 8/2013 |
| JP | 2013173416 A | 9/2013 |
| JP | 2014080046 A | 5/2014 |
| WO | 2014029549 A1 | 2/2014 |

* cited by examiner

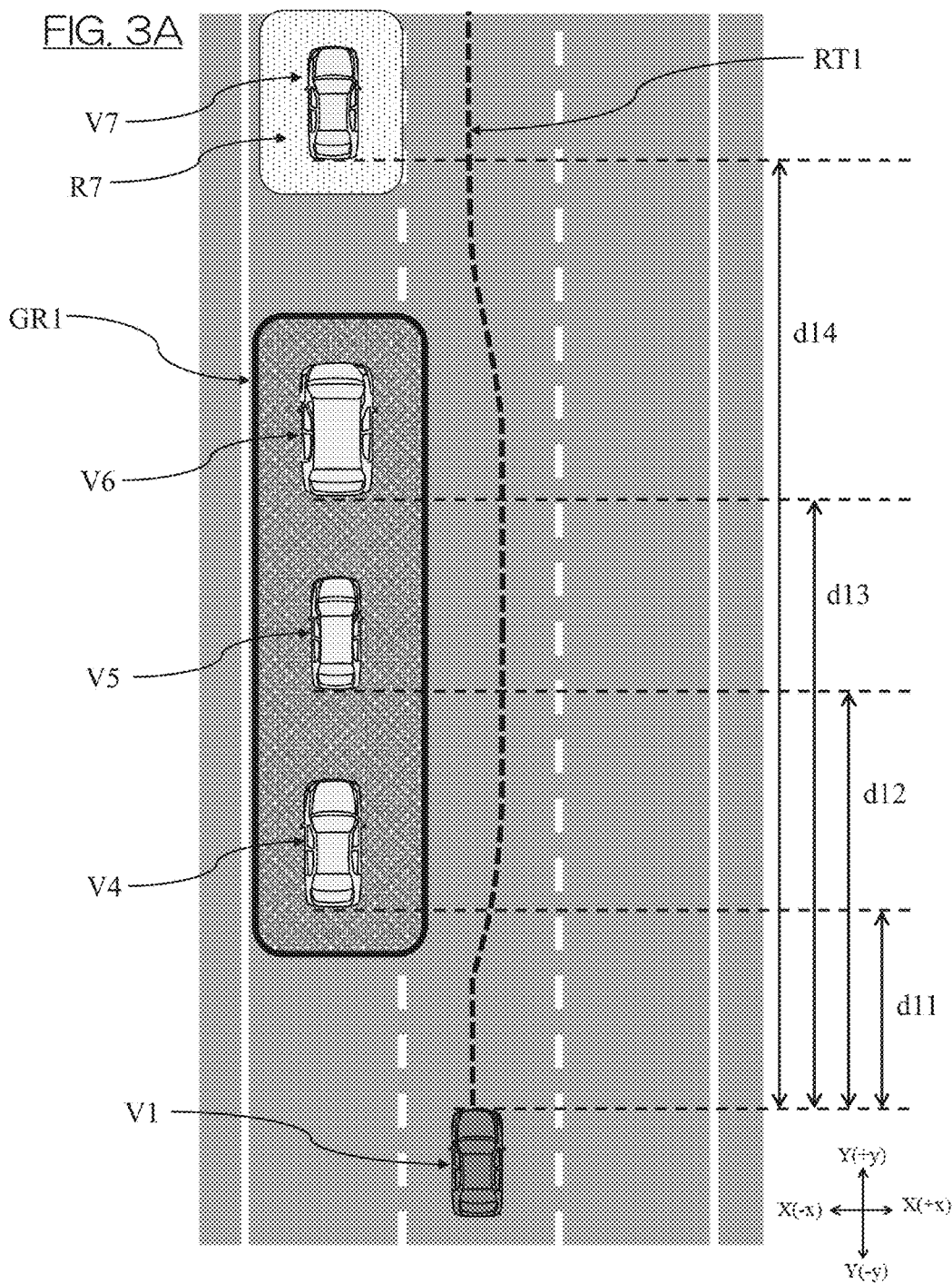

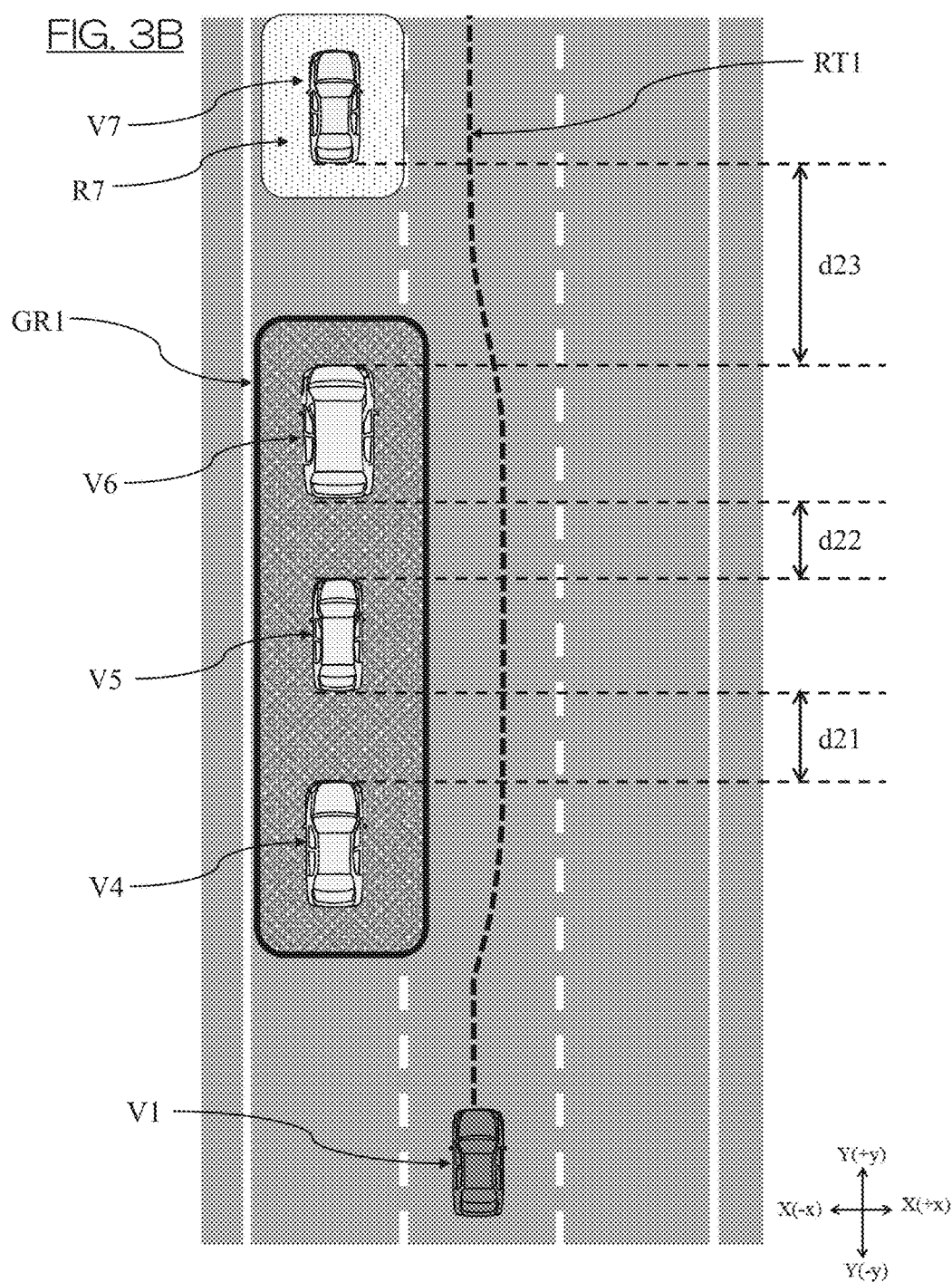

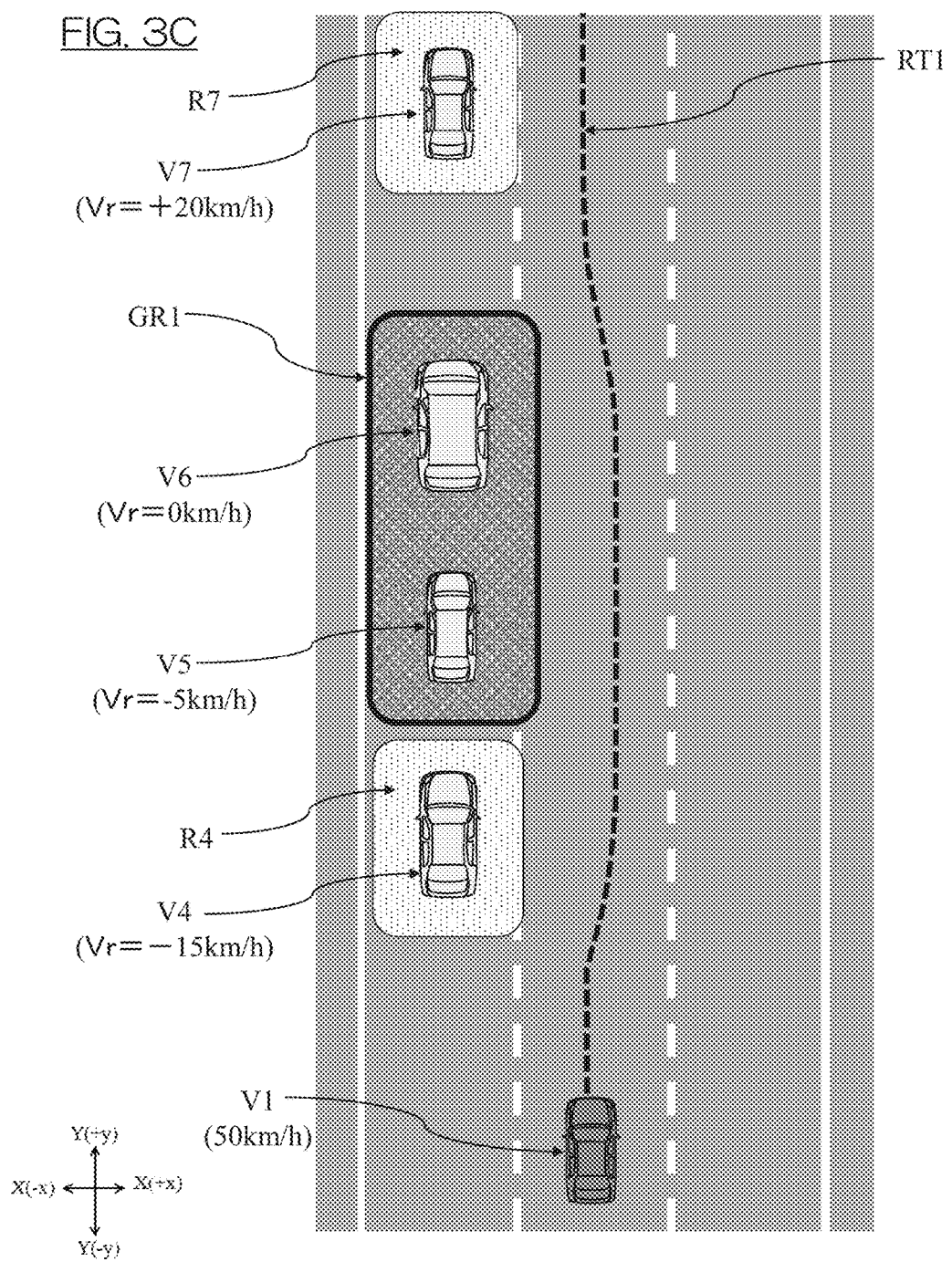

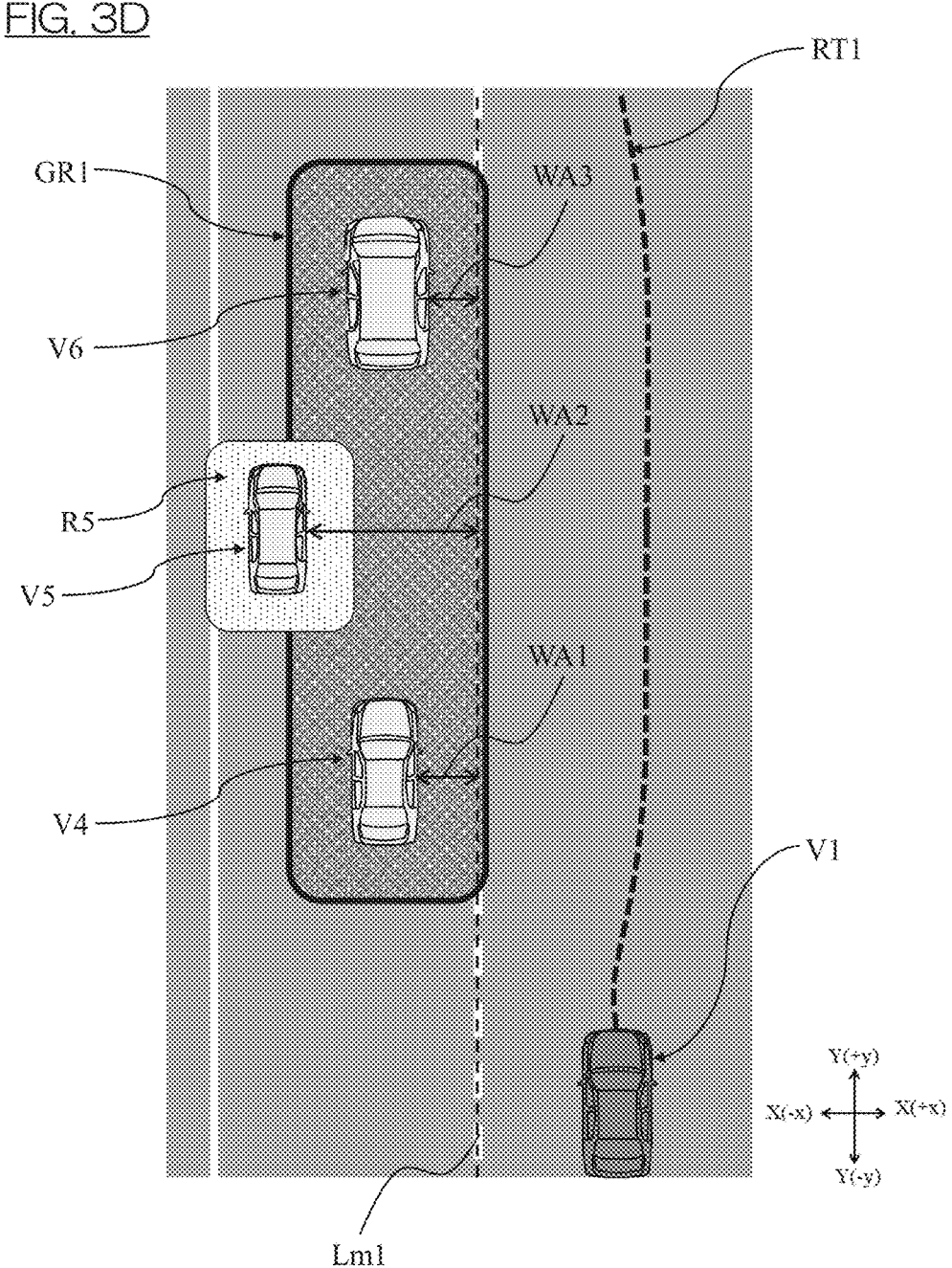

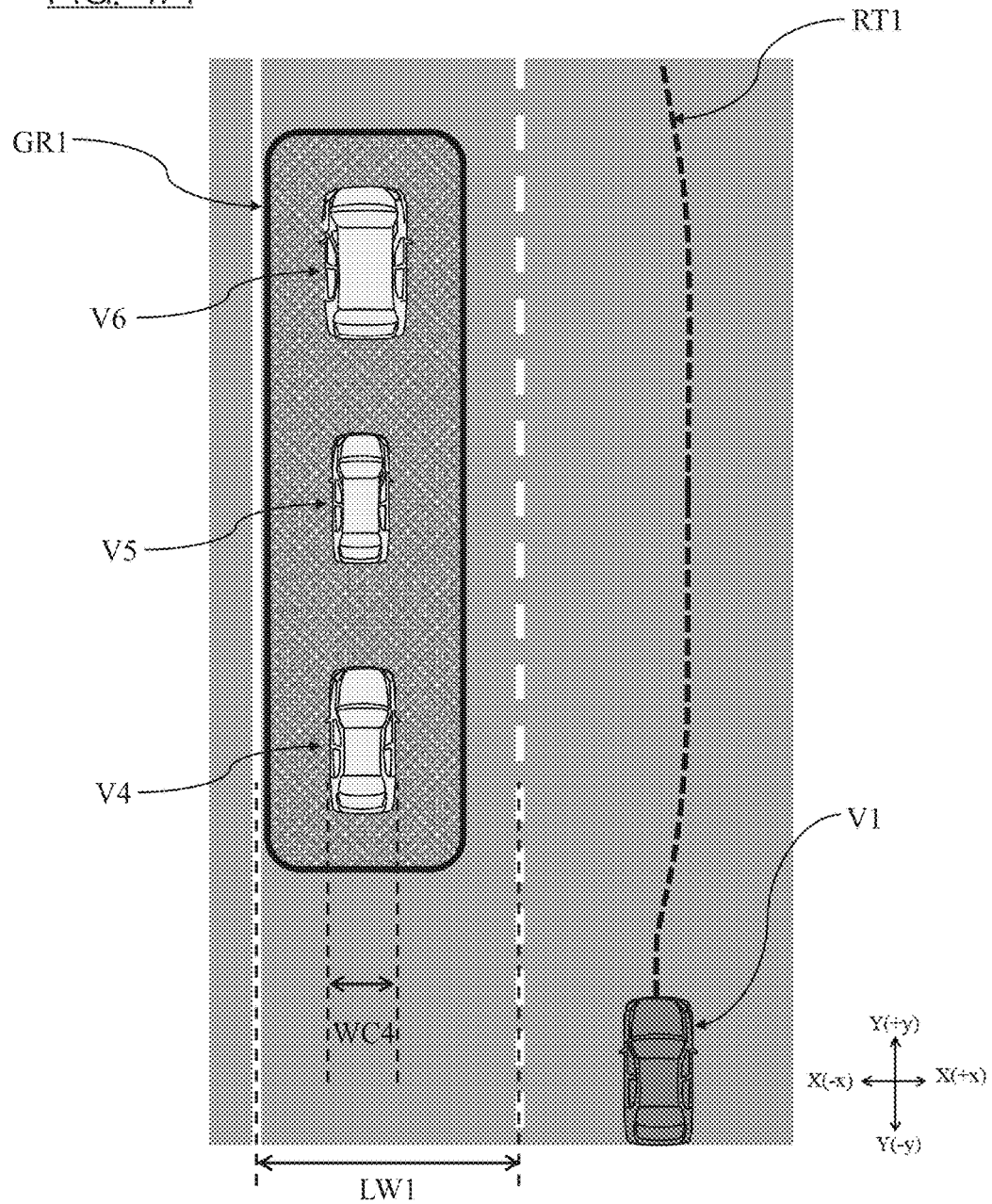

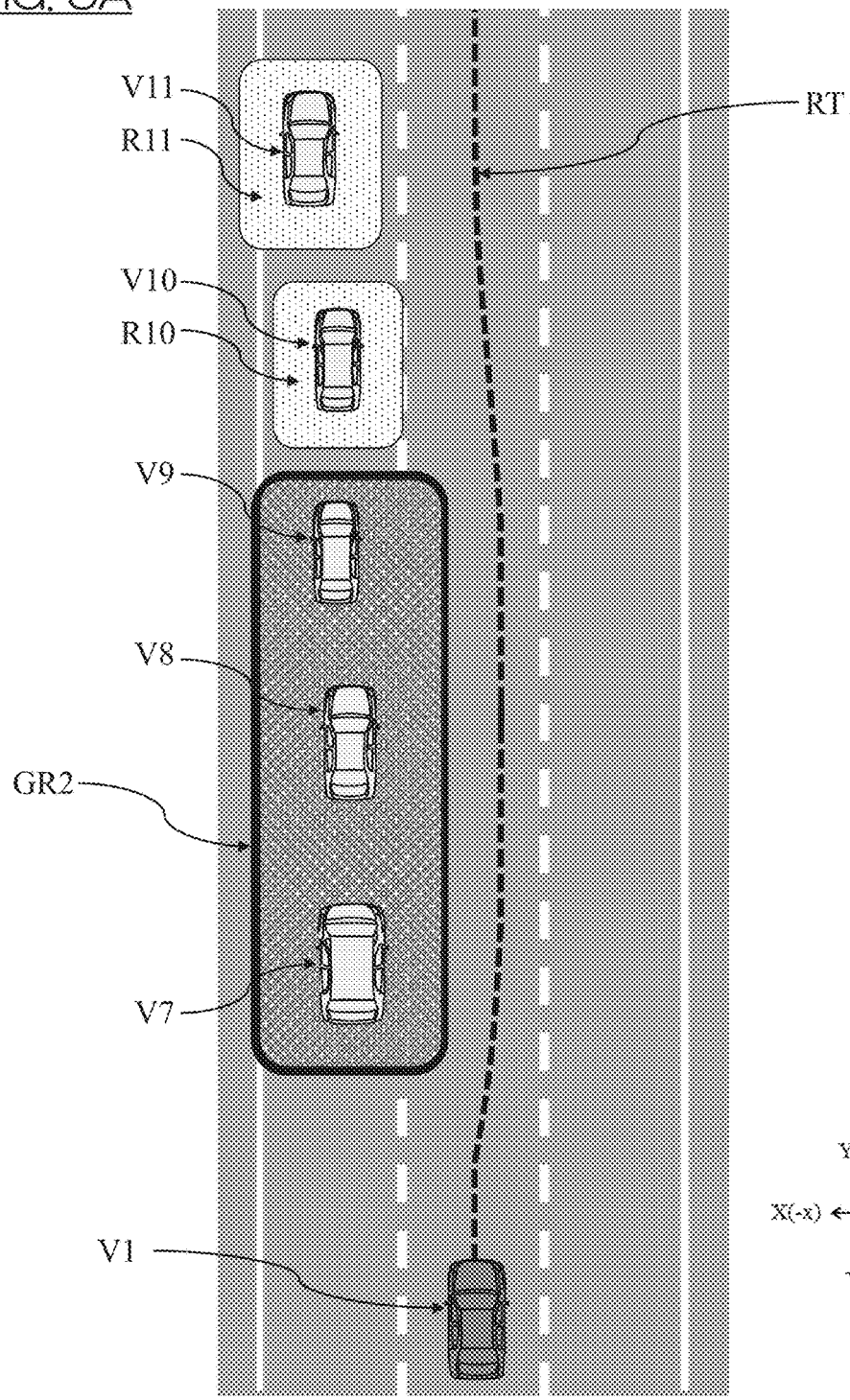

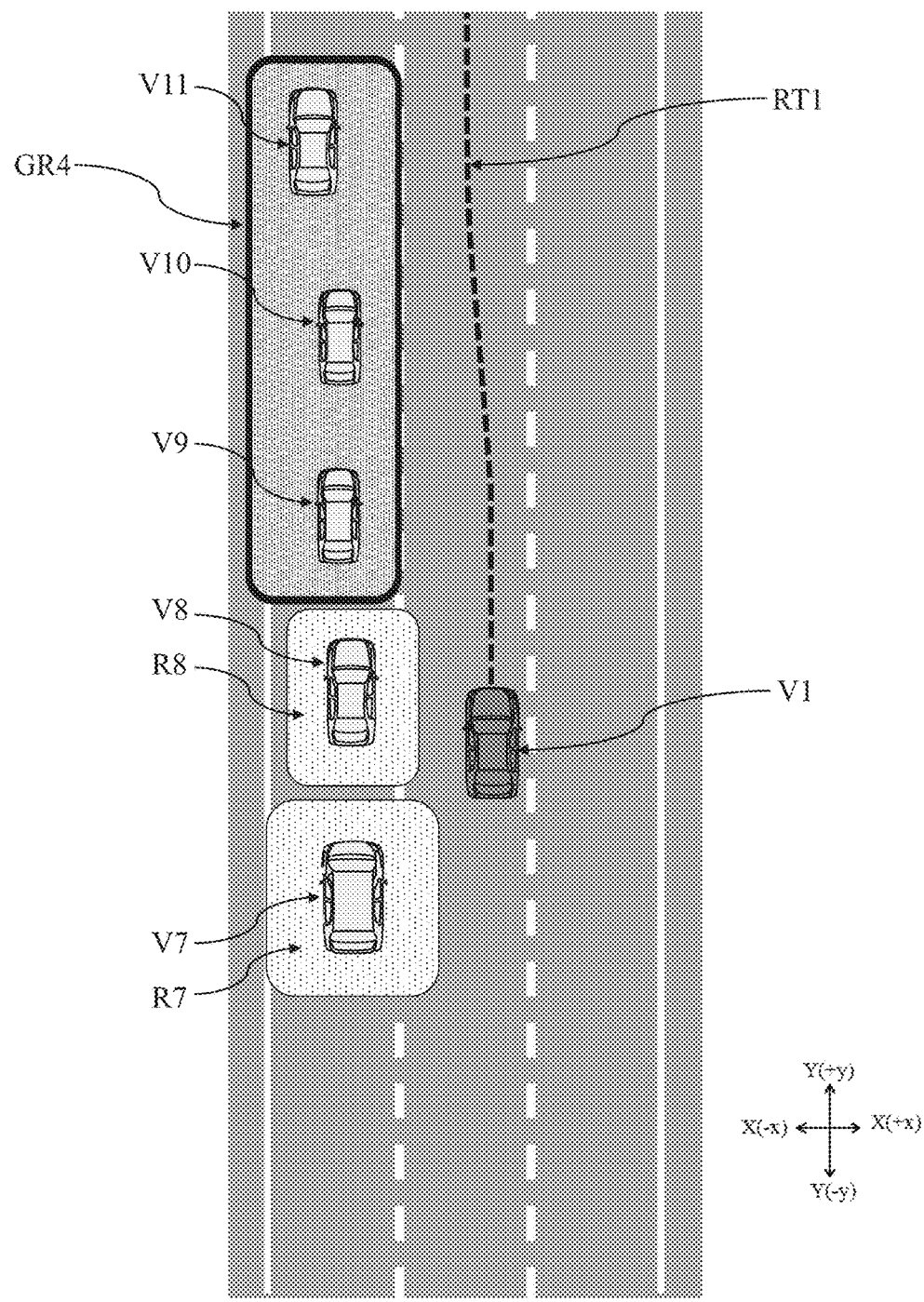

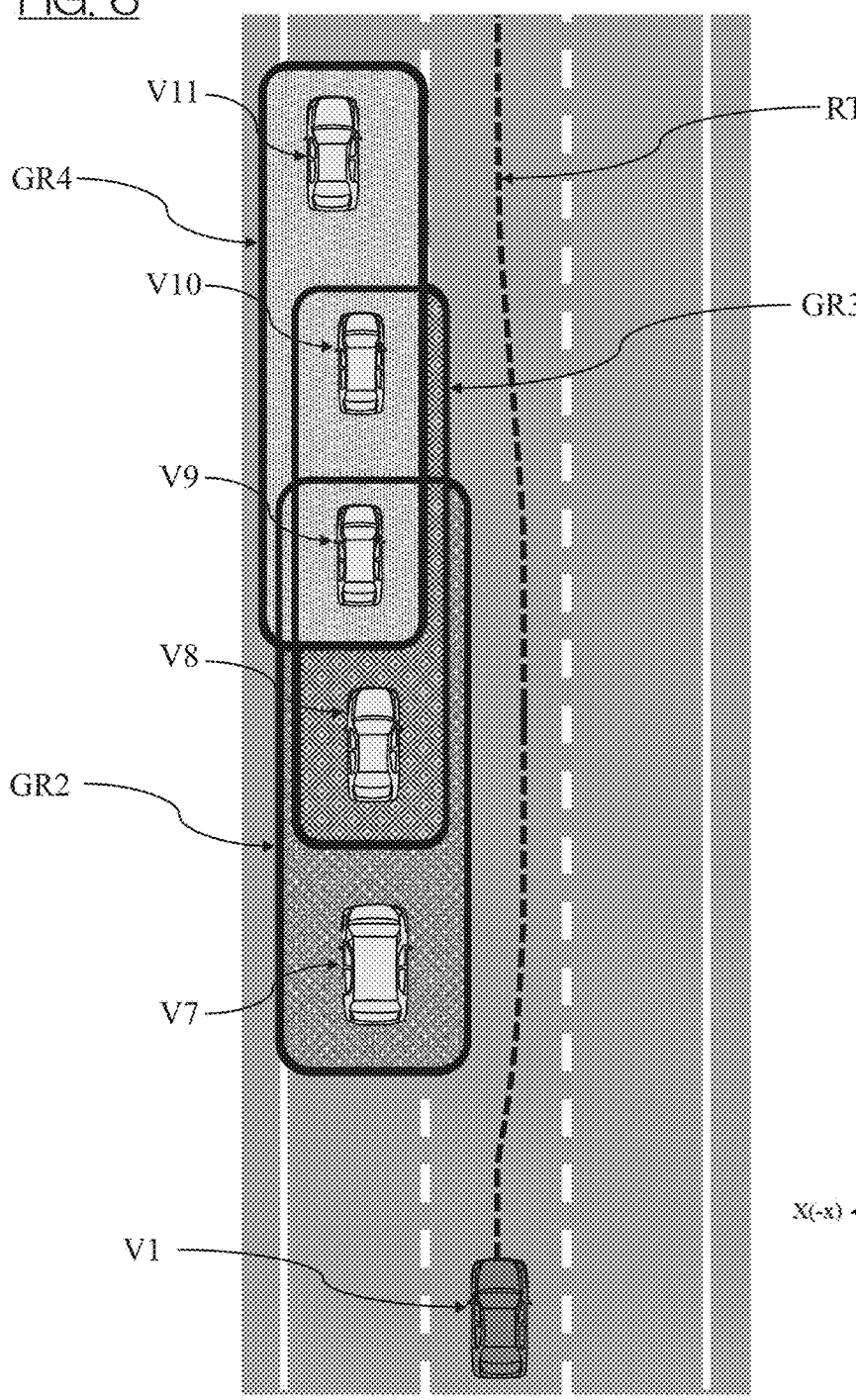

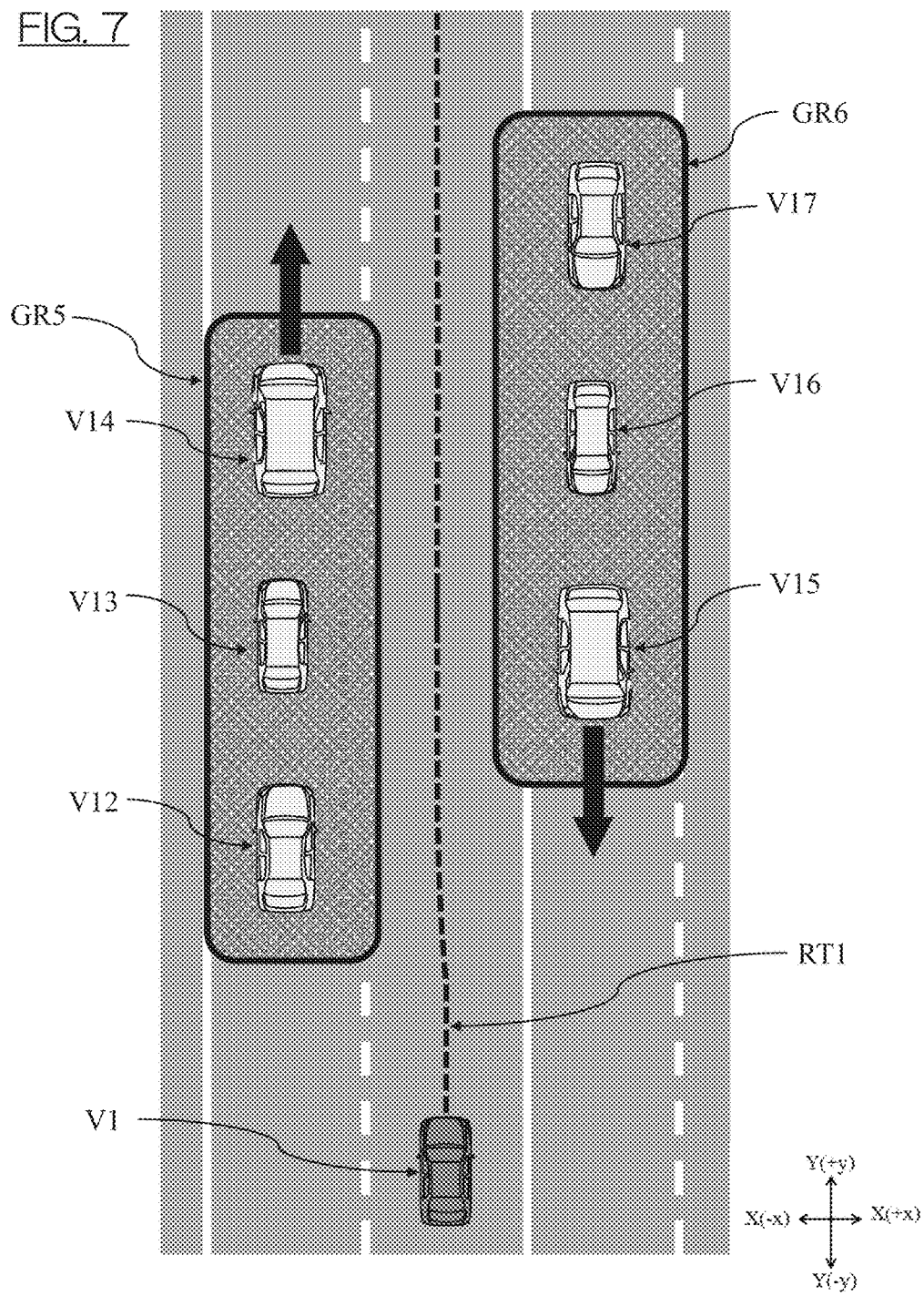

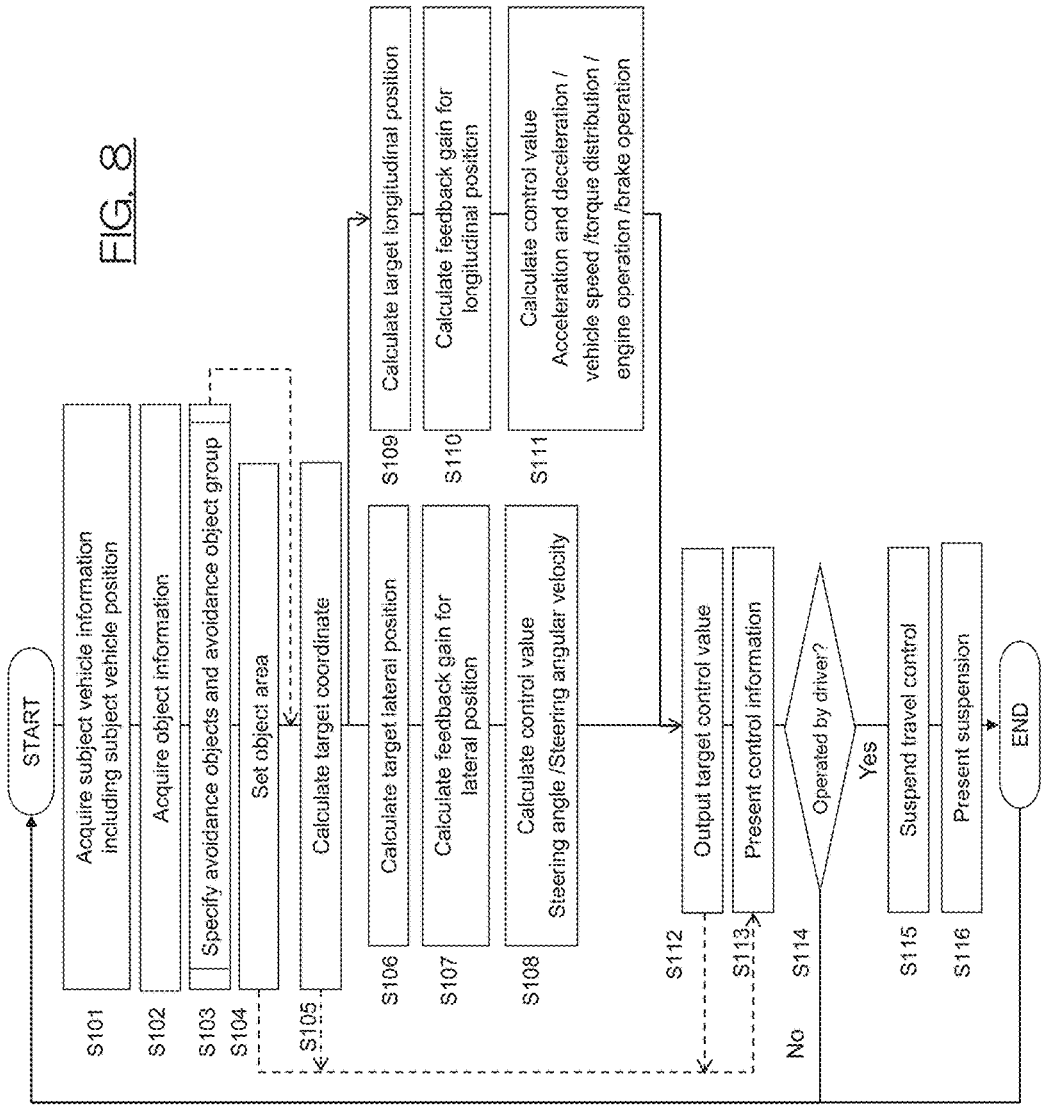

TRAVEL CONTROL DEVICE AND TRAVEL CONTROL METHOD

TECHNICAL FIELD

The present invention relates to a travel control device and travel control method that control travel of a vehicle.

BACKGROUND

A travel control device is known which plans a target route for a subject vehicle in accordance with presence or absence of an avoidance object which the subject vehicle should avoid, and drives the subject vehicle on the target route. With regard to this kind of device, a technique is known in which, when an approaching vehicle is detected around the subject vehicle, the subject vehicle is controlled so that the distance between the approaching vehicle and the subject vehicle along the vehicle width direction is maintained at a constant distance (See JP2013-091401A).

In the above technique, however, when a plurality of approaching vehicles exists around the subject vehicle, the subject vehicle may yaw laterally to give an uncomfortable feeling to the passengers because the subject vehicle is controlled so that the distance between each of the approaching vehicles and the subject vehicle along the vehicle width direction is maintained at a constant distance.

SUMMARY

A problem to be solved by the present invention is to provide a travel control device that can mitigate an uncomfortable feeling given to passengers when controlling travel of a subject vehicle.

The present invention solves the above problem as follows. When a subject vehicle is operated to travel on a target route, an avoidance object group is specified. The avoidance object includes a plurality of avoidance objects that are located within a predetermined distance from the subject vehicle and exist in the same lane adjacent to a lane in which the subject vehicle travels. A lateral position of the target route is then set so as to avoid the avoidance object group on the basis of the position of the avoidance object satisfying a predetermined condition among the avoidance objects which constitute the avoidance object group. The lateral position of the target route is along the width direction of a road on which the subject vehicle is traveling.

According to the present invention, when the subject vehicle is operated to avoid a plurality of avoidance objects, it is possible to prevent the yaw of the subject vehicle and thus mitigate an uncomfortable feeling given to the passengers.

BRIEF DESCRIPTION OF THE DRAWINGS

FIG. 3A is a plan view for describing a first example of a method of specifying an avoidance object group;

FIG. 3B is a plan view for describing a second example of a method of specifying an avoidance object group;

FIG. 3C is a plan view for describing a third example of a method of specifying an avoidance object group;

FIG. 3D is a plan view for describing a fourth example of a method of specifying an avoidance object group;

FIG. 4A is a plan view for describing an example of a method of planning a target route;

FIG. 5A is a plan view (part 1) for describing an example of a method of updating a target route;

FIG. 5C is a plan view (part 3) for describing an example of a method of updating a target route;

FIG. 6 is a plan view illustrating an example of a method of specifying a plurality of avoidance object groups;

FIG. 7 is a plan view for describing an example of a method of planning a target route for avoiding a plurality of avoidance object groups;

FIG. 8 is a flowchart illustrating a control procedure for avoiding avoidance objects and an avoidance object group.

DETAILED DESCRIPTION OF THE EMBODIMENTS

Hereinafter, one or more embodiments of the present invention will be described with reference to the drawings. In the embodiments, the present invention will be described by exemplifying examples in which the travel control device for a vehicle according to the present invention is applied to a travel control system equipped in a vehicle. Embodiments of the travel control device according to the present invention are not limited and can also be applied to a portable terminal device that can exchange information with the side of a vehicle. The travel control device, travel control system and portable terminal device are each a computer that executes a calculation process.

Figure 1:
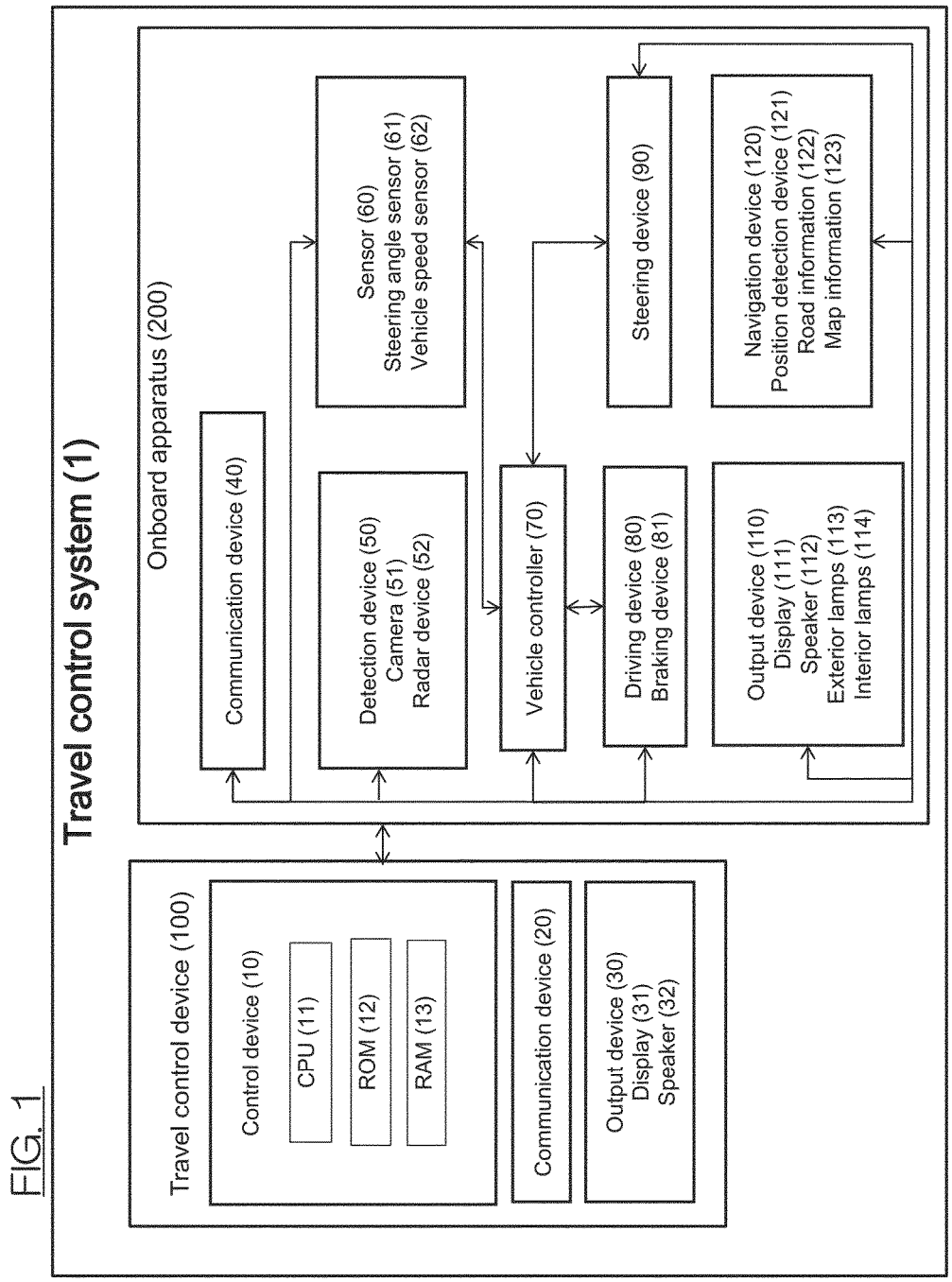
FIG. 1 is a block diagram of a travel control system according to one or more embodiments of the present invention.

FIG. 1 is a diagram illustrating a block configuration of a travel control system 1 according to one or more embodiments of the present invention. The travel control system 1 is equipped in a vehicle and comprises a travel control device 100 and an onboard apparatus 200.

The travel control device 100 according to one or more embodiments of the present invention has a lane departure prevention function (lane keep support function) to recognize a lane in which the subject vehicle is traveling and control the moving behavior of the subject vehicle so as to maintain a certain relationship between the position of a lane marker of the lane and the position of the subject vehicle. The travel control device 100 according to one or more embodiments of the present invention controls the moving behavior of the subject vehicle so that the subject vehicle travels along the center of a lane. The travel control device 100 may control the moving behavior of the subject vehicle so that the distance from the lane marker of a lane to the subject vehicle along the road width direction falls within a predetermined range. The lane marker according to one or more embodiments of the present invention is not limited, provided that it has a function to define a lane. The lane marker may be a line drawn on a road surface, a planting that exists between lanes, or a road structure that exists at the side of a road shoulder of a lane, such as a guardrail, curbstone, sidewalk, and exclusive road for two wheels. The lane marker may also be a fixed structure that exists at the side of a road shoulder of a lane, such as an advertising display, traffic sign, store, and roadside tree. The scheme of detecting such lane markers is not limited and various schemes, such as pattern matching can be used which are known at the time of filing of the present application.

The travel control device 100 and the onboard apparatus 200 have communication devices 20 and 40, respectively, and exchange information with each other via wired or wireless communication.

The onboard apparatus 200 will first be described.

The onboard apparatus 200 according to one or more embodiments of the present invention comprises a detection device 50, sensor 60, vehicle controller 70, driving device 80, steering device 90, output device 110, and navigation device 120. These devices which constitute the onboard apparatus 200 are connected to one another via a CAN (Controller Area Network) or other in-vehicle LAN to mutually exchange information.

These devices which constitute the onboard apparatus 200 will each be described below.

The detection device 50 detects the existence of an avoidance object which the subject vehicle should avoid and its existence position. The detection device 50 according to one or more embodiments of the present invention includes, but is not limited to including, a camera 51. The camera 51 according to one or more embodiments of the present invention is, for example, a camera that comprises an imaging element, such as CCD. The camera 51 according to one or more embodiments of the present invention, which is installed in the subject vehicle, captures images around the subject vehicle and acquires data of images that include avoidance objects existing around the subject vehicle. Specific examples and the like of the "avoidance objects" described in one or more embodiments of the present invention will be described later.

The detection device 50 processes the acquired image data to calculate the distance from the subject vehicle to an avoidance object on the basis of the position of the avoidance object relative to the subject vehicle. The detection device 50 also calculates, as object information, a relative speed and relative acceleration between the subject vehicle and the avoidance object from a variation over time of the position of the avoidance object. As for a process to calculate the positional relationship between the subject vehicle and another vehicle based on the image data and a process to calculate the speed information based on the amount of variation over time of the positional relationship, schemes known at the time of filing of the present application can be appropriately used.

In addition or alternatively, the detection device 50 may analyze the image data and identify the classification of the avoidance object on the basis of the analysis result. The detection device 50 can use a pattern matching technique or the like to identify whether the avoidance object included in the image data is a vehicle, pedestrian, or traffic sign. The detection device 50 can also extract the image of an object from the image data to identify a specific classification of the object (four-wheel car, two-wheel vehicle, bus, truck, construction vehicle, etc.) and a vehicle type (small-sized car, large-sized car) from the size and/or shape of the image. The detection device 50 can further identify the classification and vehicle type of the vehicle from an identifier that is represented by a license plate included in the image data. Such identification information can be used in a process to set an object area that is set for operating the subject vehicle to avoid the avoidance object.

In addition or alternatively, the detection device 50 according to one or more embodiments of the present invention may use a radar device 52. Examples of the radar device 52 may be those, such as millimeter-wave radar, laser radar and ultrasonic radar, which are known at the time of filing of the present application.

The object information detected in such a manner, including at least the position of an avoidance object, is sent to the side of the travel control device 100. The detection device 50 may include various information items in the object information and send it to the side of the travel control device 100. Examples of such information items include relative speed information and relative acceleration information between the subject vehicle and the avoidance object obtained from the variation in position of the avoidance object, information on the classification of the avoidance object, and information on the vehicle type and the like when the avoidance object is a vehicle.

The "avoidance object" in one or more embodiments of the present invention refers to an object which the subject vehicle should avoid to travel (so that the subject vehicle does not excessively come close to the object). The detection device 50 detects an object having a certain positional relationship with the subject vehicle as the avoidance object. For example, the detection device 50 can detect, as the avoidance object, an object that exists on a travel lane for the subject vehicle and within a predetermined distance from the subject vehicle. As will be understood, the travel lane for the subject vehicle in this case may be substituted by an adjacent lane or oncoming lane adjacent to the travel lane for the subject vehicle.

Avoidance objects in one or more embodiments of the present invention include a stationary object and moving object. Examples of an avoidance object that is stationary include other vehicles that are parked or stopped, road structures, such as walkways; center dividers and guardrails; road equipment, such as road signs and power or telephone poles; temporary objects on a road, such as falling objects; and removed snow, which may be obstacles for a vehicle traveling. Examples of an avoidance object that is moving include other vehicles and pedestrians. Examples of such other vehicles include preceding vehicles, following vehicles and oncoming vehicles for the subject vehicle. Examples of vehicles include two-wheel vehicles, such as bicycles and motorbikes; large-sized vehicles, such as buses and trucks; and special-purpose vehicles, such as trailers and crane cars. Examples of avoidance objects further include those in which objects may not necessarily exist but which the subject vehicle should avoid, such as construction sites, damaged areas of roads and waterholes.

In one or more embodiments of the present invention, the travel control device 100 sets respective object areas for such avoidance objects and further plans a target route for avoiding these object areas (i.e. for passing by the side of an each object area R2).

The sensor 60 according to one or more embodiments of the present invention comprises a steering angle sensor 61 and vehicle speed sensor 62. The steering angle sensor 61 detects steering information regarding the steering, such as a steering amount, steering speed and steering acceleration of the subject vehicle, and sends the steering information to the vehicle controller 70 and the travel control device 100. The vehicle speed sensor 62 detects a speed and acceleration of the subject vehicle and sends them to the vehicle controller 70 and the travel control device 100.

The vehicle controller 70 according to one or more embodiments of the present invention is an in-vehicle computer, such as an engine control unit (ECU), and electronically controls the driving state of the vehicle. The vehicle according to one or more embodiments of the present invention may be, for example, an electric car having an electric motor as the traveling drive source, an engine car having an internal-combustion engine as the traveling drive source, or a hybrid car having both the electric motor and internal combustion engine as the traveling drive sources. Examples of the electric car and hybrid car having an electric motor as the traveling drive source include a type in which the power source for the motor is a secondary battery and a type in which the power source for the motor is a fuel cell.

The driving device 80 according to one or more embodiments of the present invention comprises a drive mechanism of the subject vehicle V1. The drive mechanism includes an electric motor and/or internal-combustion engine as the above-described traveling drive source, a power transmission device including a drive shaft and automatic transmission that transmit the output of the traveling drive source to the drive wheels, and a braking device 81 that brakes wheels. The driving device 80 generates respective control signals for these components of the drive mechanism and executes the travel control including acceleration and deceleration of the vehicle. These control signals for the drive mechanism are generated on the basis of input signals by an accelerator operation and brake operation of the driver and control signals acquired from the vehicle controller 70 or from the travel control device 100. Command information may be sent to the driving device 80, which can thereby automatically perform the travel control including acceleration and deceleration of the vehicle. In the case of a hybrid car, the driving device 80 may receive a ratio of the torque output to the electric motor and the torque output to the internal-combustion engine in accordance with the traveling state of the vehicle.

The steering device 90 according to one or more embodiments of the present invention has a steering actuator. The steering actuator includes a motor and other necessary components attached to the steering column shaft. The steering device 90 executes the steering control for the vehicle on the basis of a control signal acquired from the vehicle controller 70 or an input signal by the steering operation of the driver. The vehicle controller 70 sends command information, including a steering amount, to the steering device 90 thereby to execute the steering control. In addition or alternatively, the travel control device 100 may control a braking quantity for each wheel of the vehicle thereby to execute the steering control. In this case, the vehicle controller 70 sends command information, including the braking quantity for each wheel, to the braking device 81 thereby to execute the steering control for the vehicle.

The navigation device 120 according to one or more embodiments of the present invention calculates a route from the current position of the subject vehicle to a destination and outputs route guidance information via the output device 110 which will be described later. The navigation device 120 has a position detection device 121, road information 122 including a road type, road width, road shape and others, and map information 123 in which the road information 122 is associated with each point. The position detection device 121 according to one or more embodiments of the present invention is responsible to the Global Positioning System (GPS) and detects a position (latitude and longitude) at which the vehicle is traveling. The navigation device 120 specifies a road link on which the subject vehicle travels, on the basis of the current position of the subject vehicle detected by the position detection device 121. The road information 122 according to one or more embodiments of the present invention is stored such that identification information for each road link is associated with the road type, road width, road shape, whether or not the overtaking is permitted (whether or not the lane change to an adjacent lane is permitted), and other road-related information. The navigation device 120 refers to the road information 122 to acquire the information regarding a road to which the road link on which the subject vehicle travels belongs, and sends the information to the travel control device 100. The road type, road width and road shape of a road on which the subject vehicle travels are used in a travel control process to calculate a target route on which the subject vehicle is to travel.

The output device 110 according to one or more embodiments of the present invention outputs various information items regarding the travel assistance to the user or to passengers of surrounding vehicles. In one or more embodiments of the present invention, the output device 110 outputs at least one of information in accordance with the object information, information in accordance with the location of the object area, information in accordance with the position of an avoidance object group, information in accordance with the location of the target route, and information in accordance with the command information for driving the subject vehicle on the target route. The avoidance object group is specified on the basis of a plurality of avoidance objects, as will be described later. The output device 110 according to one or more embodiments of the present invention includes a display 111, speaker 112, exterior lamps 113, and interior lamps 114. The exterior lamps 113 include headlights, winker lamps, and brake lamps. The interior lamps 114 include lighting displays of indicators and lighting displays of the display 111 as well as lamps provided at the steering and lamps provided around the steering. The output device 110 according to one or more embodiments of the present invention may output various information items regarding the travel assistance to external devices, such as Intelligent Transport Systems (ITS) via the communication device 40. The external devices, such as Intelligent Transport Systems use the information regarding the travel assistance, including the speed of the vehicle, steering information, traveling route, etc., for the traffic management of a plurality of vehicles.

Specific forms of outputting information will be described with reference to an example in which a parked vehicle as the avoidance object exists at the forward left side of the subject vehicle.

The output device 110 provides passengers of the subject vehicle with a direction and/or position in which the parked vehicle exists, as the information in accordance with the object information. The display 111 displays the direction and/or position in which the parked vehicle exists in a form that can be visually recognized. The speaker 112 reads out a text that informs the direction and/or position in which the parked vehicle exists, such as "Please be advised a parked vehicle exists at the forward left side." Among lamps provided as the exterior lamps 113 at left and right door mirrors, only the left-side lamp may be blinked to inform the subject vehicle's passengers that a parked vehicle exists at the forward left side. Among lamps provided as the interior lamps 114 at the left and right in the vicinity of the steering, only the left-side lamp may be blinked to inform the passengers that a parked vehicle exists at the forward left side.

A direction and/or position in which the object area is set may be output via the output device 110 as the information in accordance with the location of the object area. The passengers can be informed that an object area is set at the forward left side, in a similar manner to the above, via the display 111, speaker 112, exterior lamps 113, and/or interior lamps 114.

In one or more embodiments of the present invention, in view of preliminarily informing other vehicles' passengers of the moving behavior of the subject vehicle, the direction and/or position in which the object area is set for an avoidance object or for an avoidance object group may be output to the external using the exterior lamps 113. After the object area is set, the travel direction of the subject vehicle is changed (steering is performed) to avoid the object area. By informing the external of the object area being set, the drivers of other vehicles can be preliminarily noticed that the travel direction of the subject vehicle will be changed to avoid the object area. For example, when the object area is set at the frontward left side, right-side winker lamps (exterior lamps 113) may be lighted to inform the external other vehicles and the like that the subject vehicle will deviate rightward to avoid the object area which is set at the left side.

Further, the passengers can be informed of the shape of the target route and/or the position of a curve point as the information in accordance with the location of the target route, by the display 111 and/or the speaker 112. The display 111 displays the shape and the like of the target route as a diagrammatic view that can be visually recognized. The speaker 112 outputs an announcement, such as "To avoid the parked vehicle ahead, the steering will be turned to the right."

Furthermore, passengers of the subject vehicle or passengers of other vehicles may be preliminarily informed that the steering operation and/or acceleration or deceleration will be performed, as the information in accordance with the command information for driving the subject vehicle on the target route, via the display 111, speaker 112, exterior lamps 113 and/or interior lamps 114.

Thus, by outputting the information regarding the travel control when avoiding the object area, passengers of the subject vehicle and/or other vehicles can be preliminarily informed of the behavior of the subject vehicle. The output device 110 may output the above-described information to external devices, such as the Intelligent Transport Systems via the communication device 20. This allows the passengers of the subject vehicle and/or the passengers of other vehicles to respond to the behavior of the subject vehicle which is under the travel control.

The travel control device 100 according to one or more embodiments of the present invention will then be described.

As illustrated in FIG. 1, the travel control device 100 according to one or more embodiments of the present invention comprises a control device 10, communication device 20, and output device 30. The communication device 20 exchanges information with the onboard apparatus 200. The output device 30 has a similar function to that of the previously-described output device 110 of the onboard apparatus 200. When the travel control device 100 is a computer that can be carried by a passenger, the travel control device 100 may output, to each device, command information for controlling the blinking of the exterior lamps 113 and/or interior lamps 114 of the onboard apparatus 200.

The control device 10 of the travel control device 100 is a computer comprising: a ROM (Read Only Memory) 12 that stores programs for presenting different travel control information in accordance with the degree of proximity between the subject vehicle and other vehicles; a CPU (Central Processing Unit) 11 as an operation circuit that executes the programs stored in the ROM 12 to function as the travel control device 100; and a RAM (Random Access Memory) 13 that functions as an accessible storage device.

The control device 10 of the travel control device 100 according to one or more embodiments of the present invention has a subject vehicle information acquisition function, object information acquisition function, object area setting function, route planning function, control function, and presentation function. The control device 10 according to one or more embodiments of the present invention executes each function by cooperation of software for realizing the above functions and the above-described hardware.

Each function of the travel control device 100 according to one or more embodiments of the present invention will be described below.

First, the subject vehicle information acquisition function of the control device 10 will be described. The control device 10 acquires subject vehicle information that includes the position of the subject vehicle. The position of the subject vehicle can be acquired by the position detection device 121 of the navigation device 120. The subject vehicle information further includes the vehicle speed and acceleration of the subject vehicle. The control device 10 acquires the speed of the subject vehicle from the vehicle speed sensor 62. The speed of the subject vehicle can also be acquired on the basis of a variation over time of the position of the subject vehicle. The acceleration of the subject vehicle can be obtained from the speed of the subject vehicle.

The object information acquisition function of the control device 10 will be described. The control device 10 acquires object information that includes the position of an avoidance object which the subject vehicle should avoid. The control device 10 acquires the object information which includes the position of the avoidance object detected by the detection device 50. The object information further includes a relative position, relative speed and relative acceleration of the avoidance object.

When the avoidance object is another vehicle and this other vehicle and the subject vehicle are capable of inter-vehicle communication (communication in which a plurality of vehicles can directly communicate with one another without using a server or the like), the control device 10 of the subject vehicle may acquire, as the object information, the vehicle speed and acceleration of the other vehicle detected by the vehicle speed sensor of the other vehicle. As will be understood, the control device 10 can also acquire avoidance information that includes the position, speed and acceleration of the other vehicle from external devices, such as the Intelligent Transport Systems.

The object area setting function and route planning function of the control device 10 will be described. In one or more embodiments of the present invention, the control device 10 uses the object area setting function to set an object area R for the avoidance object. Then, the control device 10 uses the route planning function to plan a target route on which the subject vehicle V1 is to travel, on the basis of the location of the object area R set for the avoidance object.

Figure 2:
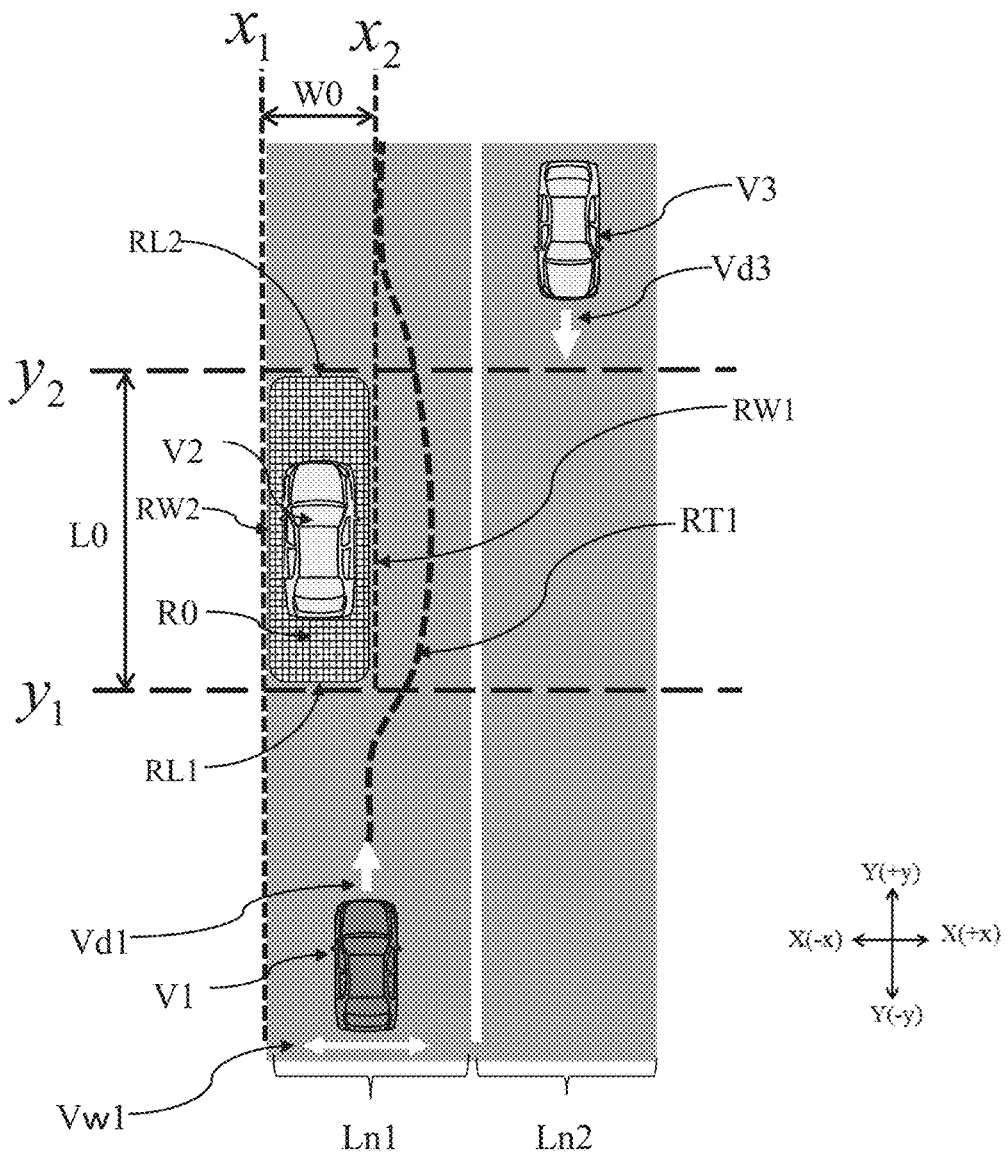
FIG. 2 is a plan view for describing a process to set an object area used for planning a target route.

A method of setting the object area R using the object area setting function of the control device 10 will first be described. The control device 10 sets the object area R (any object area may be denoted by "R" hereinafter) for the avoidance object on the basis of the relationship between the position of the subject vehicle and the position of the avoidance object. FIG. 2 is a view illustrating an example of a scheme to set the object area R. In FIG. 2, the travel direction Vd1 of the subject vehicle is +y direction in the figure. In FIG. 2, the extending direction of a travel lane Ln1 in which the subject vehicle travels is also +y direction in the figure.

FIG. 2 is a view when viewing from above a scene of detecting another vehicle V2 that is parked at the left-side road shoulder of the travel lane Ln1 for the subject vehicle. The detected other vehicle V2 exists in the travel lane Ln1 for the subject vehicle V1 and is therefore an avoidance object which the subject vehicle V1 should avoid because the other vehicle V2 will interfere the subject vehicle V1 traveling straight ahead. The control device 10 sets an object area R0 within a region that includes the other vehicle V2.

In one or more embodiments of the present invention, the object area set for an avoidance object may be set with consideration for avoiding a state in which the distance between the subject vehicle V1 and the avoidance object becomes less than a predetermined value so that they come close to each other or come into contact with each other, or may also be set with consideration for the subject vehicle V1 and the avoidance object to maintain an appropriate distance. In one or more embodiments of the present invention, the object area may have a shape that analogously follows the outer shape of an avoidance object or may also have a shape that includes an avoidance object. The control device 10 may set the border of the object area as a shape that analogously follows the outer shape of an avoidance object or as a shape that includes an avoidance object, such as a circular shape, elliptical shape, rectangular shape, and polygonal shape. The object area may be set narrow such that the boundary of the object area is separate from the surface (outer edge) of an avoidance object by less than a predetermined distance (A) or may also be set wide such that the boundary of the object area is separate from the avoidance object by a predetermined distance B (B>A) or more.

As illustrated in FIG. 2, when the travel direction Vd1 of the subject vehicle is defined as the forward direction while its reverse direction is defined as the backward direction, the object area R0 has longitudinal end parts RL1 and RL2 at the rear side and front side of the object area R0, respectively. These longitudinal end parts RL1 and RL2 represent end lines that define the length of the object area R0 along the extending direction (+y) of the travel lane Ln1 for the subject vehicle. The length of the object area R0 illustrated in FIG. 2 along the extending direction (+y) of the travel lane Ln1 is L0 that is a distance between the longitudinal end part RL1 (y1) and the longitudinal end part RL2 (y2). Among the longitudinal end parts RL1 and RL2, the longitudinal end part located at near side (upstream side) when viewed from the subject vehicle V1 approaching the object area R0 is defined as a first end part RL1. On the other hand, among the longitudinal end parts RL1 and RL2, the longitudinal end part located at far side (downstream side) when viewed from the subject vehicle V1 approaching or passing by the object area R0 is defined as a second end part RL2.

As illustrated in FIG. 2, when the vehicle width direction of the subject vehicle is defined as Vw1 (X-axis direction in the figure), the object area R0 has lateral end parts RW1 and RW2 at the right side and left side of the object area R0, respectively. These lateral end parts RW1 and RW2 are end lines that define the length (width) of the object area R0 along the road width direction (X) of the travel lane Ln1 for the subject vehicle. The length of the object area R0 illustrated in FIG. 2 along the road width direction (X-axis direction) is W0 that is a distance between the lateral end part RW1 (x1) and the lateral end part RW2 (x2). When the subject vehicle comes close to the avoidance object V2 along the vehicle width direction, among the lateral end parts RW1 and RW2 of the object area R0, the lateral end part located at the side of the subject vehicle V1 when viewed from the subject vehicle V1 is defined as a first lateral end part RW1. On the other hand, among the lateral end parts RW1 and RW2, the lateral end part located at the side (road shoulder side) opposite to the side of the subject vehicle V1 when viewed from the subject vehicle V1 is defined as a second lateral end part RW2.

FIG. 2 illustrates an exemplary case in which the other vehicle V2 as the avoidance object exists in the travel lane Ln1 for the subject vehicle, but also in cases where the avoidance object exists in a lane other than the travel lane Ln1 for the subject vehicle, an object area can be similarly set for the avoidance object when the subject vehicle V1 should avoid the avoidance object.

When, as illustrated in FIG. 2, there is another vehicle V3 traveling in the opposite direction in an oncoming lane Ln2 of the travel lane Ln1 for the subject vehicle V1, the other vehicle V3 is detected as an avoidance object. Although not illustrated in the figure, when the other vehicle V3 is detected as an avoidance object, an object area is set within a region that includes the other vehicle V3, in the same manner.

In one or more embodiments of the present invention, when a plurality of avoidance objects exists around the subject vehicle V1, the control device 10 further employs the following method to specify the plurality of avoidance objects as an avoidance object group, that is, a set of avoidance objects, and set an object area for the specified avoidance object group.

FIG. 3A is a plan view for describing an example of the method of specifying an avoidance object group. FIG. 3A illustrates a scene in which four other vehicles V4 to V7 as avoidance objects are traveling in +y direction in the same lane which is the forward left side lane viewed from the subject vehicle V1.

When detecting the four other vehicles V4 to V7 as avoidance objects as illustrated in FIG. 3A, the control device 10 according to one or more embodiments of the present invention first obtains respective distances d11 to d14 from the subject vehicle V1 to the other vehicles V4 to V7. The method used to obtain the distances d11 to d14 may be, but is not limited to, a method in which the onboard apparatus 200 acquires an image captured ahead the subject vehicle V1 using the camera 51 of the detection device 50 or the like and performs image processing of the captured image thereby to calculate respective distances from the front end of the subject vehicle V1 to the rear ends of the other vehicles V4 to V7. In an alternative embodiment, distances from the center of the subject vehicle V1 to the centers of the other vehicles V4 to V7 may be obtained as the distances d11 to d14.

Then, the control device 10 according to one or more embodiments of the present invention extracts, on the basis of the obtained distances d11 to d14, other vehicles that are located within a predetermined distance from the subject vehicle V1, and specifies those existing in the same lane among the extracted other vehicles as an avoidance object group. The predetermined distance can be arbitrarily set but may be, for example, 20 to 100 meters or the like. In the example illustrated in FIG. 3A, the control device 10 according to one or more embodiments of the present invention determines that three other vehicles V4 to V6 are located within the predetermined distance from the subject vehicle V1 and these three other vehicles V4 to V6 exist in the same lane, and specifies the three other vehicles V4 to V6 as an avoidance object group. The other vehicle V7 traveling most ahead is located far from the subject vehicle by a longer distance than the predetermined distance and therefore excluded from the avoidance object group. The control device 10 then sets an object area GR1 for the specified avoidance object group. As illustrated in FIG. 3A, the control device 10 sets an individual object area R7 for the other vehicle V7 which is not included in the avoidance object group. Thus, in one or more embodiments of the present invention, the control device 10 perceives the three other vehicles V4 to V6 as one avoidance object group and plans a target route for passing by the avoidance object group. The control device 10 can thereby effectively prevent the yaw/stagger of the subject vehicle V1 when controlling the subject vehicle V1 to avoid the other vehicles V4 to V6.

In one or more embodiments of the present invention, as illustrated in FIG. 3B, the avoidance object group may be specified with consideration for distances between other vehicles (so-called inter-vehicle distances between adjacent other vehicles) in the four other vehicles V4 to V7. That is, the control device 10 according to one or more embodiments of the present invention obtains the closest distance, which is a distance from the nearest other vehicle, for each of the other vehicles. Specifically, the control device 10 first extracts, for the other vehicle V4, the other vehicle V5 which is closest to the other vehicle V4, and obtains a distance d21 between the other vehicle V4 and the other vehicle V5 as the closest distance. Similarly, the control device 10 obtains a distance d22 as the closest distance for the other vehicle V5, obtains the distance d22 as the closest distance for the other vehicle V6 (this distance d22 is the same as the above closest distance for the other vehicle V5), and obtains a distance d23 as the closest distance for the other vehicle V7. Subsequently, the control device 10 according to one or more embodiments of the present invention specifies, as an avoidance object group, the three other vehicles V4 to V6 for which the closest distances obtained are within a predetermined distance threshold, and sets an object area GR1 for the avoidance object group. The closest distance d23 for the other vehicle V7 traveling most ahead exceeds the predetermined distance threshold and the other vehicle V7 is therefore excluded from the avoidance object group. The above predetermined distance threshold can be arbitrarily set but may be, for example, 10 to 20 meters or the like.

The control device 10 according to one or more embodiments of the present invention may specify, as an avoidance object group, a plurality of avoidance objects of which the relative speeds Vr to the subject vehicle V1 is within a predetermined range. This will be described with reference to an exemplary case of FIG. 3C in which, when the subject vehicle V1 travels at a speed of 50 km/h, for example, the other vehicle V4 travels at 35 km/h (relative speed Vr is −15 km/h), the other vehicle V5 travels at 45 km/h (relative speed Vr is −5 km/h), the other vehicle V6 travels at 50 km/h (relative speed Vr is 0 km/h), and the other vehicle V7 travels at 70 km/h (relative speed Vr is +20 km/h). In this scene, on the basis of the relative speeds Vr of the four other vehicles V4 to V7, the control device 10 specifies two other vehicles V5 and V6 of which the relative speeds Vr are within a predetermined range (e.g. within ±10 km/h) as an avoidance object group. In this case, for the other vehicles V4 and V7 of which the relative speeds Vr fall outside the predetermined range, individual object areas R4 and R7 are set as illustrated in FIG. 3C. The relative speeds Vr can be determined using relative speed information that is included in the object information acquired by the above-described object information acquisition function of the control device 10.

In one or more embodiments of the present invention, when specifying an avoidance object group, the control device 10 may take into account, as illustrated in FIG. 3D, distances WA1 to WA3 between a lane marker on the road and avoidance objects. For example, as illustrated in FIG. 3D, when the lane marker at the subject vehicle V1 side in the lane in which the three other vehicles V4 to V6 are traveling is represented by Lm1, the distance WA1 between the other vehicle V4 and Lm1, the distance WA2 between the other vehicle V5 and Lm1, and the distance WA3 between the other vehicle V6 and Lm1 are obtained and the avoidance object group is specified in accordance with the distances WA1 to WA3. Specifically, the control device 10 specifies the distances WA1 and WA3 which are closer values to each other among the distances WA1 to WA3, specifies the other vehicle V4 associated with the distance WA1 and the other vehicle V6 associated with the distance WA3 as the avoidance object group, and sets the object area GR1. In this case, the other vehicle V5 of which the distance WA2 is large relative to the distances WA1 and WA2 is excluded from the avoidance object group and an individual object area R5 is set for the other vehicle V5.

In one or more embodiments of the present invention, with regard to the avoidance object group to be specified in the above-described manner, the upper limit may be provided for the number of avoidance objects included in the avoidance object group. For example, the control device 10 can limit the number of avoidance objects included in the avoidance object group up to three.

In one or more embodiments of the present invention, a target route RT1 for the subject vehicle to pass by the object area GR1 is planned on the basis of the object area GR set for such an avoidance object group.

In this operation, the control device 10 according to one or more embodiments of the present invention may plan the target route RT1 to be a route that allows the subject vehicle to appropriately pass by the avoidance object group. In one or more embodiments of the present invention, an avoidance object satisfying a predetermined condition among a plurality of avoidance objects that constitute the avoidance object group is extracted, and the lateral position (position in X-axis direction) of the target route RT1 can be planned as follows on the basis of the position of the extracted avoidance object.

For example, when the control device 10 specifies the other vehicles V4 to V6 as an avoidance object group as illustrated in FIG. 4A, the control device 10 extracts the other vehicle V4 which is nearest to the subject vehicle V1 along the travel direction of the subject vehicle V1 (Y-axis direction) among the other vehicles V4 to V6 included in the avoidance object group. Then, the wider the width WC4 of the extracted other vehicle V4 is, the control device 10 sets the lateral position of the target route RT1 at a farther location from the avoidance object group (location in +x direction in the scene illustrated in FIG. 4A). That is, the wider the width WC4 of the other vehicle V4 is, the control device 10 plans the target route RT1 so as to more significantly avoid the avoidance object group.

In this operation, the control device 10 may calculate the ratio of the width WC4 of the other vehicle V4 to the width LW1 of the lane in which the other vehicle V4 is traveling as a lane occupancy ratio (WC4/LW1) of the other vehicle V4. Then, the higher the lane occupancy ratio of the other vehicle V4 is, the control device 10 may set the lateral position of the target route RT1 at a farther location from the avoidance object group.

Figure 4B:
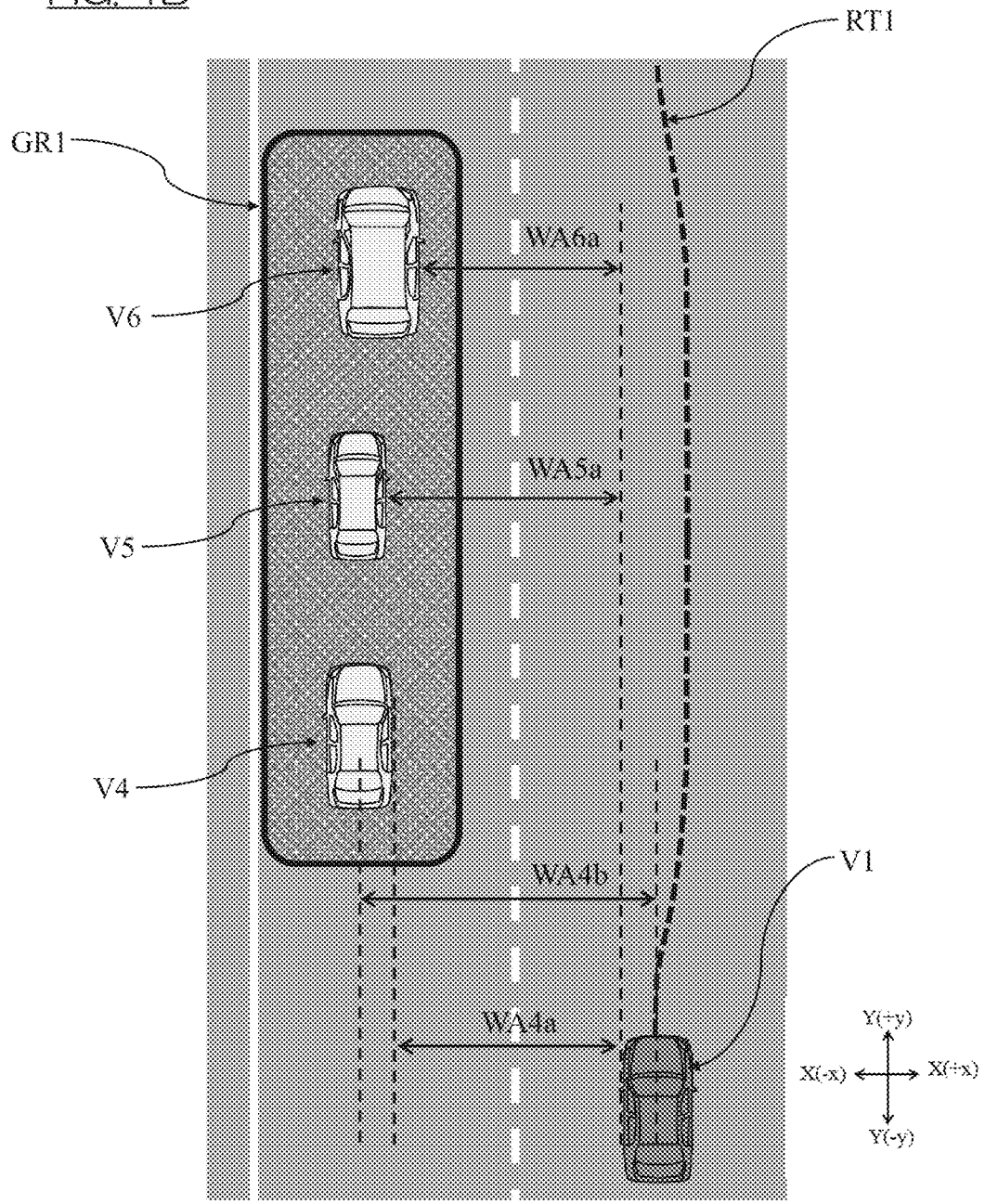
FIG. 4B is a plan view for describing another example of a method of planning a target route.

In addition or alternatively, as illustrated in FIG. 4B, the control device 10 may extract the other vehicle V4 which is nearest to the subject vehicle V1 along the travel direction of the subject vehicle V1, and the shorter the distance between the extracted other vehicle V4 and the subject vehicle V1 along the road width direction is, the control device 10 may set the lateral position of the target route RT1 at a farther location from the avoidance object group. As illustrated in FIG. 4B, the distance between the other vehicle V4 and the subject vehicle V1 along the road width direction may be a distance WA4a between the side surface of the other vehicle V4 at the subject vehicle V1 side and the side surface of the subject vehicle V1 at the other vehicle V4 side, or may also be a distance WA4b between the center of the other vehicle V4 and the center of the subject vehicle V1.

In addition or alternatively, as illustrated in FIG. 4B, the control device 10 may extract the other vehicle V6 which is nearest to the subject vehicle V1 along the width direction of the road (X-axis direction) among the other vehicles V4 to V6 included in the avoidance object group (i.e. the other vehicle V6 associated with the shortest distance WA6a among the distances WA4a, WA5a, and WA6a illustrated in FIG. 4B). Then, the shorter the distance between the extracted other vehicle V6 and the subject vehicle V1 is, the control device 10 may set the lateral position of the target route RT1 at a farther location from the avoidance object group. As illustrated in FIG. 4B, the distance between the other vehicle V6 and the subject vehicle V1 along the road width direction may be a distance WA6a between the side surface of the other vehicle V6 at the subject vehicle V1 side and the side surface of the subject vehicle V1 at the other vehicle V6 side, or may also be a distance between the center of the other vehicle V6 and the center of the subject vehicle V1 (not illustrated).

In one or more embodiments of the present invention, the higher the relative speed of an avoidance object included in the avoidance object group to the subject vehicle V1 is, the control device 10 may set the lateral position of the target route RT1 at a farther location from the avoidance object group. For example, in the above-described scene illustrated in FIG. 3C, the higher the relative speed Vr of any of the other vehicles V5 and V6 to the subject vehicle V1 is, the lateral position of the target route RT1 is set at a farther location from the avoidance object group.

Figure 5B:
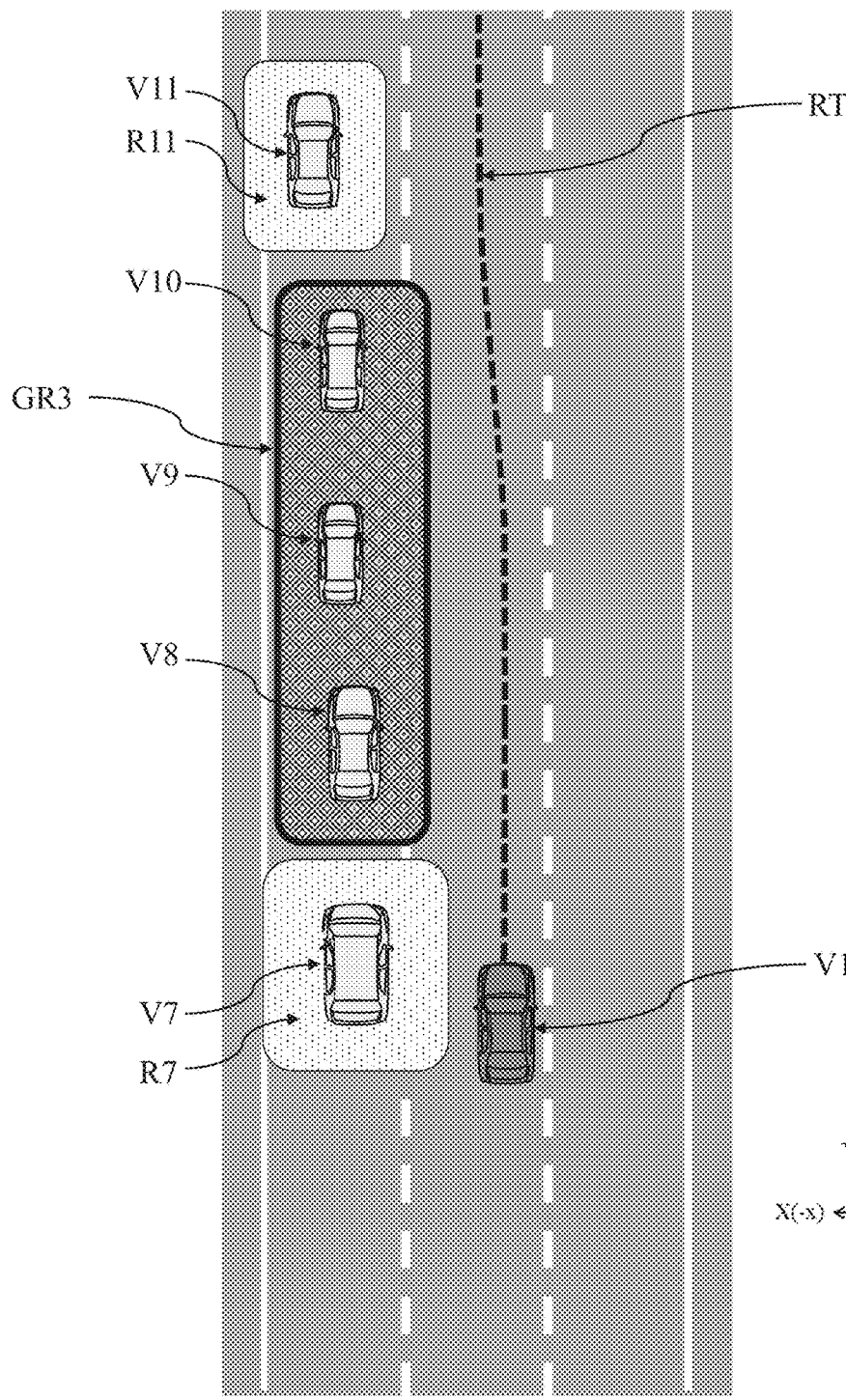
FIG. 5B is a plan view (part 2) for describing an example of a method of updating a target route.

In one or more embodiments of the present invention, the control device 10 can appropriately update the avoidance object group while the subject vehicle V1 is traveling. For example, as illustrated in FIG. 5A to FIG. 5C, the control device 10 updates the avoidance object group in accordance with a travel distance and/or travel time of the subject vehicle V1.

This will be more specifically described. First, as illustrated in FIG. 5A, when other vehicles V7 to V11 exist as avoidance objects, the control device 10 extracts, for example, three other vehicles V7 to V9 in order of the distance from the subject vehicle V1 in the travel direction of the subject vehicle V1, specifies the other vehicles V7 to V9 as an avoidance object group, and sets an object area GR2 for the avoidance object group. Then, as illustrated in FIG. 5B, in a scene in which the subject vehicle V1 is passing by the other vehicle V7 as the subject vehicle V1 travels, the control device 10 specifies three other vehicles V8 to V10 traveling ahead the subject vehicle V1 as an avoidance object group and sets an object area GR3 for the avoidance object group. Then, as illustrated in FIG. 5C, in a scene in which the subject vehicle V1 is passing by the other vehicle V8, the control device 10 specifies three other vehicles V9 to V11 traveling ahead the subject vehicle V1 as an avoidance object group and sets an object area GR4 for the avoidance object group.

In one or more embodiments of the present invention, as illustrated in FIG. 6, the control device 10 may simultaneously set a plurality of avoidance object groups. In this operation, the control device 10 can extract, for example, five other vehicles V7 to V11 in order of the distance from the subject vehicle V1 along the travel direction of the subject vehicle V1 and specify respective avoidance object groups for combinations of the extracted other vehicles V7 to V11.

This will be more specifically described. First, the control device 10 extracts the other vehicle V7 nearest to the subject vehicle V1, specifies the other vehicle V7 and the other vehicles 8 and 9 which exist at positions in the travel direction of the subject vehicle V1 viewed from the other vehicle V7 as an avoidance object group, and sets an object area GR2 for the avoidance object group. Then, the control device 10 extracts the other vehicle V8 nearer to the subject vehicle V1 next to the other vehicle 7, specifies the other vehicle V8 and the other vehicles 9 and 10 which exist at positions in the travel direction of the subject vehicle V1 viewed from the other vehicle V7 as an avoidance object group, and sets an object area GR3 for the avoidance object group. Similarly, the control device 10 extracts the other vehicle V9 nearer to the subject vehicle V1 next to the other vehicle 8, specifies the other vehicles 9 to 11 as an avoidance object group, and sets an object area GR4 for the avoidance object group. Although not illustrated in FIG. 6, the control device 10 can specify one or more avoidance object groups for those including the other vehicles 10 and 11.

As the above, in one or more embodiments of the present invention, the control device 10 uses the object area setting function to set one or more object areas for avoidance objects or for one or more avoidance object groups.

Then, the control device 10 uses the route planning function to plan a target route RT1 for avoiding the object area or areas. A method of planning the target route RT1 may be as follows. For example, the control device 10 sets one or more target coordinates (traveling points at which the subject vehicle V1 can avoid the object area or areas) on the basis of the object area or areas set for the avoidance objects or for the avoidance object group or groups and connects the current position of the subject vehicle V1 with the target coordinate or coordinates, and the target route RT1 can thereby be obtained. In one or more embodiments of the present invention, the control device 10 may calculate the target route RT1 such that the subject vehicle V1 does not enter the set object area or areas, may calculate the target route RT1 such that an area at which the object area or areas and a possible existence area of the subject vehicle V1 overlap each other is less than a predetermined value, may calculate a sequence of positions separate from the boundary of the object area or areas by a predetermined distance as the target route RT1, or may calculate the boundary itself of the object area or areas as the target route RT1. As previously described, the object area or areas are set such that the distance between the subject vehicle V1 and the avoidance objects does not become less than a predetermined value or such that the distance between the subject vehicle V1 and the avoidance objects is maintained at a predetermined threshold. Consequently, the target route RT1 is also set at a location at which the distance between the subject vehicle V1 and the avoidance objects does not become less than the predetermined value or at a location at which the distance between the subject vehicle V1 and the avoidance objects is maintained at the predetermined threshold.

As will be understood, in one or more embodiments of the present invention, one or more target coordinates may be set on the basis of the positions or the like of the avoidance objects or of the avoidance object group or groups without setting an object area for the avoidance objects or for the avoidance object group or groups and the target route RT1 may be obtained as the above on the basis of the target coordinate or coordinates. That is, the target route RT1 for avoiding the avoidance objects or the avoidance object group or groups may be obtained without setting an object area.

In one or more embodiments of the present invention, as illustrated in FIG. 7, the control device 10 may specify other vehicles V15 to V17 traveling on the oncoming lane in the opposite direction to the subject vehicle V1 as an avoidance object group.

As illustrated in FIG. 7, when other vehicles V12 to V14 traveling in the same direction as the subject vehicle V1 and other vehicles V15 to V17 traveling in the oncoming lane exist around the subject vehicle V1, the control device 10 according to one or more embodiments of the present invention can specify the other vehicles V12 to V14 as one avoidance object group and set an object area GR5 and can also specify the other vehicles V15 to V17 as another avoidance object group and set an object area GR6. In this operation, the control device 10 plans a target route RT1 that allows the subject vehicle V1 to pass by the opposing avoidance object group in the object area GR6 while avoiding the avoidance object group in the object area GR5.

In this case, the control device 10 sets the lateral position of the target route RT1 in accordance with the relative speeds Vr to the subject vehicle V1 of the other vehicles included in respective avoidance object groups. Specifically, in the scene illustrated in FIG. 7, the relative speeds Vr are higher in the other vehicles V15 to V17 traveling in the oncoming lane and therefore the control device 10 sets the lateral position of the target route RT1 at a location that is more separate from the object area GR for the avoidance object group which includes the other vehicles V15 to V17. That is, the control device 10 plans the target route RT1 such that the target route RT1 is more separate from the object area GR6 and moderately comes close to the object area GR5. Alternatively, the control device 10 may plan the target route RT1 such that the subject vehicle V1 can travel in an approximately straight line toward +y direction to an extent that allows the subject vehicle V1 to sufficiently avoid the other vehicles V12 to V17, without taking into account the object areas GR5 and GR6.

Thus, in one or more embodiments of the present invention, the control device 10 uses the route planning function to plan the target route.

Next, the control function of the control device 10 will be described. The control function is used to output command information for driving the subject vehicle V1 on the target route RT1 to the vehicle controller 70, driving device 80, and steering device 90.

Acquiring the command information from the control device 10, the vehicle controller 70 controls the driving device 80 and steering device 90 to operate the subject vehicle V1 to travel along the target route RT1. The vehicle controller 70 performs control of the steering device 90 such that the subject vehicle travels while maintaining a certain lateral position to the lane, using the road shape detected by the detection device 50, the road information 122 from the navigation device 120, and a lane marker model stored in the map information 123. The vehicle controller 70 calculates a steering control amount on the basis of the steering angle acquired from the steering angle sensor 61, the vehicle speed acquired from the vehicle speed sensor 62, and information on the current for a steering actuator and sends a current command to the steering actuator to perform the control such that the subject vehicle travels at a target lateral position. The method of controlling the lateral position of the subject vehicle V1 is not limited to using the above-described steering device 90. In addition or alternatively, the driving device 80 and/or the braking device 81 may be used to control the travel direction (i.e. lateral position) of the subject vehicle V1 on the basis of the rotational speed difference between the right and left drive wheels. In this sense, the "turning" of a vehicle is intended to encompass the cases of using the driving device 80 and/or the braking device 81 in addition to the cases of using the steering device 90.

Thus, in one or more embodiments of the present invention, when avoidance objects are detected, one or more object areas are set for an individual avoidance object and/or for one or more avoidance object groups including a plurality of avoidance objects and a target route RT1 is planned so as to avoid the object area or areas. Then, the travel control is performed such that the subject vehicle V1 travels along the target route RT1. Moreover, in one or more embodiments of the present invention, detection of avoidance objects, setting of one or more specific object areas for one or more avoidance object groups, calculation of the target route RT1, and travel control based on the target route RT1 are repeatedly performed at regular intervals. This allows the control device 10 to sequentially plan the target route RT1 for the subject vehicle V1 on the basis of the updated surrounding situations around the subject vehicle V1. Therefore, the subject vehicle V1 can travel on a route suitable for the surrounding situations around the subject vehicle V1.

Finally, the presentation function of the control device 10 according to one or more embodiments of the present invention will be described. The control device 10 calculates information in accordance with the object information, information in accordance with the location of the object area or areas, information in accordance with the location of the avoidance object group or groups, information in accordance with the location of the target route, and information in accordance with the command information for driving the subject vehicle on the target route and sends the calculated information to the output device 110, which then outputs it to the external in the above-described manner.

A travel control process according to one or more embodiments of the present invention will then be described with reference to the flowcharts of FIGS. 8 and 9. The contents of the process in each step are as described above and the flow of the process will be mainly described below.

First, the procedure of the travel control as a whole will be described with reference to FIG. 8. As described above, in one or more embodiments of the present invention, the travel control process illustrated in FIG. 8 is repeatedly executed at regular intervals.

In step S101, the control device 10 acquires subject vehicle information that includes at least the position of the subject vehicle V1. The subject vehicle information may further include the vehicle speed and/or acceleration of the subject vehicle V1. In step S102, the control device 10 acquires, from the detection device 50, object information that includes the positions of avoidance objects which the subject vehicle V1 should avoid. The object information may further include the speed and/or acceleration of the avoidance objects.

In step S103, the control device 10 specifies a plurality of avoidance objects that satisfy a predetermined condition as an avoidance object group on the basis of the object information acquired in step S102 and specifies one or more avoidance objects that are not specified as the avoidance object group as one or more individual avoidance objects. A method of specifying the avoidance objects and avoidance object group illustrated in step S103 will be described later.

In step S104, the control device 10 sets one or more object areas for the individual avoidance object or objects and/or for the avoidance object group.

In step S105, the control device 10 calculates a target coordinate and target route RT1 for avoiding the object area or areas. The target route RT1 includes one or more target coordinates at which the subject vehicle V1 is to travel. Each target coordinate includes a target lateral position (target X-coordinate) and a target longitudinal position (target Y-direction). The target coordinate or coordinates and the target route RT1 are obtained by connecting the calculated one or more target coordinates and the current position of the subject vehicle V1. Step S104 for the process of setting the object area or areas may be skipped and the routine may proceed from step S103 to step S105 for the process of calculating the target coordinate or coordinates. In this case, the control device 10 calculates the target coordinate or coordinates and the target route RT1 so as to avoid the avoidance objects and/or the avoidance object group.

In step S106, the control device 10 acquires the target lateral position or positions of the target coordinate or coordinates calculated in step S105. In step S107, the control device 10 compares the current lateral position of the subject vehicle V1 with the target lateral position or positions acquired in step S106 and calculates a feedback gain for the lateral position on the basis of the comparison result.

In step S108, the control device 10 calculates a target control value on the basis of the actual lateral position of the subject vehicle V1, the target lateral position corresponding to the current position, and the feedback gain of step S107. The target control value relates to a steering angle, steering angular velocity and other necessary parameters for moving the subject vehicle V1 on the target lateral position. Then, in step S112, the control device 10 outputs the calculated target control value to the onboard apparatus 200. This allows the subject vehicle V1 to travel on the target route RT which is defined by the target lateral position. When a plurality of target coordinates is calculated in step S105, the process of steps S106 to S112 are repeated every time the target lateral position is acquired, and the target control value for each target lateral position acquired is output to the onboard apparatus 200.

In step S109, the control device 10 acquires the target longitudinal position or positions of the one or more target coordinates calculated in step S105. In step S110, the control device 10 compares the current longitudinal position and the vehicle speed and acceleration at the current position of the subject vehicle V1 with the target longitudinal position corresponding to the current longitudinal position and the vehicle speed and acceleration at the target longitudinal position and calculates a feedback gain for the longitudinal position on the basis of the comparison result. In step S111, the control device 10 calculates a target control value for the longitudinal position on the basis of the vehicle speed and acceleration corresponding to the target longitudinal position and the feedback gain for the longitudinal position calculated in step S110. As in the previously-described steps S106 to S108 and S112, the process of steps S109 to S112 are repeated every time the target longitudinal position is acquired, and the target control value for each target longitudinal position acquired is output to the onboard apparatus 200.

Here, the target control value for the longitudinal position (in the longitudinal direction) refers to a control value for each of the operation of drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve the acceleration, deceleration and vehicle speed corresponding to the target longitudinal position. For example, in an engine car, the control function is used to calculate a target amount of intake air (target opening degree of the throttle valve) and a target amount of fuel injection on the basis of calculated values of the current and target acceleration, deceleration and vehicle speed and send them to the driving device 80. Alternatively, the control function may be used to calculate the acceleration, deceleration and vehicle speed and send them to the vehicle controller 70, which may calculate a control value for each of the operation of drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve these acceleration, deceleration and vehicle speed.

The routine then proceeds to step S112 in which the control device 10 outputs the target control value for the longitudinal direction calculated in step S111 to the onboard apparatus 200. The vehicle controller 70 executes the steering control and drive control to operate the subject vehicle to travel on the target route RT which is defined by the target lateral position and target longitudinal position.

In step S113, the control device 10 controls the output device 110 to present information. The information presented by the output device 110 may be the location/speed of the object area or areas calculated in step S104, the shape of target route calculated in step S105, or the target control value output to the onboard apparatus 200 in step S112.

In step S114, a determination is made as to whether the driver intervenes in the operation, such as whether the driver performs the steering operation. When the operation by the driver is not detected, the routine returns to step S101, from which the setting of one or more new object areas, calculation of target route, and travel control are repeated. On the other hand, when the operation by the driver is detected, the routine proceeds to step S115, in which the travel control is suspended. Step S115 is followed by step S116, in which presentation of information is made that the travel control is suspended.

Figure 9:
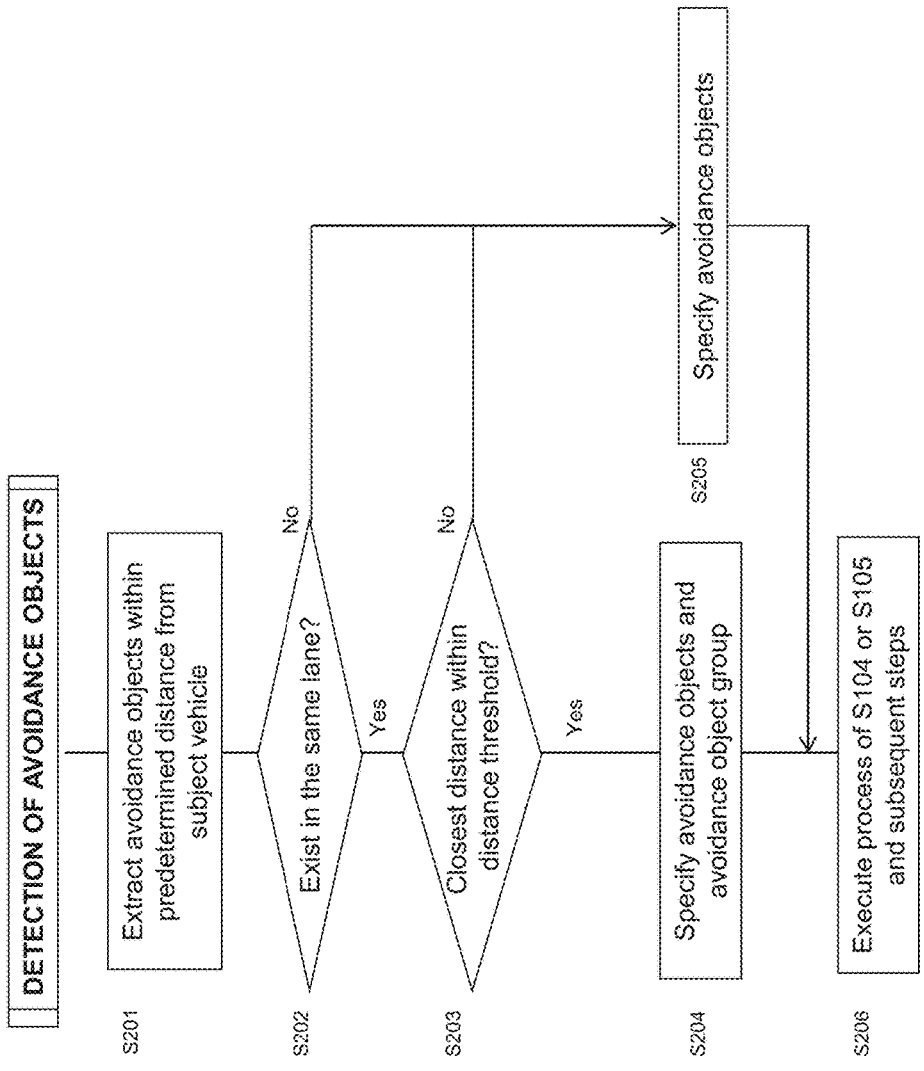
FIG. 9 is a flowchart illustrating a subroutine of step S103 of FIG. 8.

Referring now to the flowchart of FIG. 9, a process to specify the avoidance objects and avoidance object group of step S103 is illustrated. This process will be described below.

First, in step S201, the control device 10 extracts avoidance objects that are located within a predetermined distance from the subject vehicle V1. Specifically, the control device 10 extracts avoidance objects that are located within a predetermined distance from the subject vehicle V1, on the basis of the positional information of the avoidance objects acquired from the detection device 50 in step S103 of FIG. 8.

In step S202, the control device 10 determines whether or not there is a plurality of avoidance objects that exist in the same lane among the avoidance objects extracted in step S201. Specifically, when at least two avoidance objects exist in a lane, the control device 10 determines that there is a plurality of avoidance objects that exist in the same lane. When, in step S202, it is determined that there is a plurality of avoidance objects that exist in the same lane, the routine proceeds to step S203. When it is determined that there is not a plurality of avoidance objects that exist in the same lane, the routine proceeds to step S205.

In step S203, for each of the plurality of avoidance objects which are determined to exist in the same lane in step S202, the control device 10 determines whether or not the distance from an adjacent avoidance object is within a predetermined distance threshold. More specifically, when, as described above with reference to FIG. 3B, the other vehicles V4 to V7 are detected as avoidance objects that exist in the same lane, the control device 10 obtains the closest distances (distances d21 to d23 illustrated in FIG. 3B), which are distances from the nearest other vehicles, for the other vehicles. Then, the control device 10 determines whether or not avoidance objects of which the closest distances are within the distance threshold exist, on the basis of the obtained nearest distances. When, in step S203, it is determined that avoidance objects of which the closest distances are within the distance threshold exist, the routine proceeds to step S204. When it is determined that avoidance objects of which the closest distances are within the distance threshold do not exist, the routine proceeds to step S205.

In step S204, the control device 10 specifies the plurality of avoidance objects of which the closest distances are determined within the distance threshold in step S203, as an avoidance object group. In addition, the control device 10 also specifies the avoidance object which is excluded from the avoidance object group, as an individual avoidance object.

On the other hand, when it is determined in step S202 that there are not avoidance objects that exist in the same lane or when it is determined in step S203 that avoidance objects of which the closest distances are within the distance threshold do not exist, the routine proceeds to step S205 in which the control device 10 specifies each avoidance object as an individual avoidance object on the basis of the positional information of the avoidance objects acquired from the detection device 50 in step S102 of FIG. 8, without specifying an avoidance object group.

Steps S204 and S205 are followed by step S206 in which the control device 10 starts, as necessary, the process of calculating a target route in step S104 of FIG. 8 for the specified avoidance objects and/or avoidance object group and then executes the process of step S105 and subsequent steps.

The travel control device 100 according to one or more embodiments of the present invention is configured and operates as the above and therefore has the following effects.

(1) According to the travel control device 100 in one or more embodiments of the present invention, a plurality of avoidance objects that are located within a predetermined distance from the subject vehicle V1 and exist in the same lane adjacent to the lane in which the subject vehicle travels is specified as an avoidance object group, and the lateral position of the target route RT1 is planned so as to avoid the avoidance object group on the basis of the position of the avoidance object satisfying a predetermined condition among the avoidance objects which constitute the avoidance object group. Therefore, even when a plurality of avoidance objects exists around the subject vehicle V1, it is possible to prevent the yaw of the subject vehicle V1 due to individually performing travel control for the avoidance objects. Thus, an uncomfortable feeling given to the passengers can be mitigated when performing travel control for the subject vehicle V1.

(2) According to the travel control device 100 in one or more embodiments of the present invention, a plurality of avoidance objects of which the relative speeds Vr to the subject vehicle V1 are within a predetermined range is specified as an avoidance object group thereby to exclude an avoidance object of which the relative speed Vr is particularly high and an avoidance object of which the relative speed Vr is particularly low from the avoidance object group. Therefore, the subject vehicle V1 can avoid these avoidance objects as individual avoidance objects. Thus, the travel control for the subject vehicle V1 can be appropriately performed in accordance with the relative speeds Vr of avoidance objects.

(3) According to the travel control device 100 in one or more embodiments of the present invention, a plurality of avoidance objects of which the closest distances from adjacent avoidance objects are within a predetermined distance threshold is specified as an avoidance object group thereby to prevent the avoidance object group from being set to be unnecessarily large. Therefore, the travel control for the subject vehicle V1 can be appropriately performed in accordance with the relative positions of the avoidance objects.

(4) According to the travel control device 100 in one or more embodiments of the present invention, a plurality of avoidance objects of which distances between the avoidance objects and a lane marker at the subject vehicle V1 side among a pair of lane markers that define a lane in which the avoidance objects exist is specified as an avoidance object group thereby to exclude, from the avoidance object group, an avoidance object that is particularly close to the subject vehicle V1 along the width direction of the road and an avoidance object that is particularly far from the subject vehicle V1 along the width direction of the road. Therefore, the subject vehicle V1 can avoid these avoidance objects as individual avoidance objects. Thus, the travel control for the subject vehicle V1 can be appropriately performed in accordance with the positions avoidance objects.

(5) According to the travel control device 100 in one or more embodiments of the present invention, avoidance objects are extracted each in order of distance from the subject vehicle V1 along the travel direction of the subject vehicle V1 and respective avoidance object groups are specified for the extracted avoidance objects. Therefore, the target route RT1 is to be planned in accordance with the avoidance object groups which are specified ahead the subject vehicle V1 traveling. As a result, the yaw of the subject vehicle V1 can be more appropriately prevented.

(6) According to the travel control device 100 in one or more embodiments of the present invention, the number of avoidance objects included in one avoidance object group is equal to or smaller than a predetermined number thereby to prevent the avoidance object group from being set to be unnecessarily large. Therefore, the travel control for the subject vehicle V1 can be appropriately performed in accordance with the positions of the avoidance objects.

(7) According to the travel control device 100 in one or more embodiments of the present invention, the specified avoidance object group is updated in accordance with the travel distance or travel time of the subject vehicle V1. Therefore, an appropriate avoidance object group and appropriate target route RT1 can be planned in accordance with the situations around the subject vehicle V1 when the subject vehicle V1 is traveling. Thus, the travel control for the subject vehicle V1 can be appropriately performed.

(8) According to the travel control device 100 in one or more embodiments of the present invention, the lateral position of the target route RT1 is planned in accordance with the position, width, or lane occupancy ratio of an avoidance object that is closest to the subject vehicle V1 along the travel direction of the subject vehicle V1 among the plurality of avoidance objects included in the avoidance object group. Therefore, the target route RT1 can be planned in accordance with information on an avoidance object that is close to the subject vehicle V1 and easy to detect. Thus, the travel control for the subject vehicle V1 can be appropriately performed.

(9) According to the travel control device 100 in one or more embodiments of the present invention, an avoidance object that is closest to the subject vehicle V1 along the width direction of the road among the plurality of avoidance objects included in the avoidance object group is extracted, and the closer the extracted avoidance object is to the subject vehicle V1 along the width direction, the lateral position of the target route RT1 is planned at a further separate position from the avoidance object group. Therefore, the target route RT1 can be planned in accordance with the avoidance object which is close to the subject vehicle V1 and highly necessary to be avoided by the subject vehicle V1. Thus, the travel control for the subject vehicle V1 can be appropriately performed.

(10) According to the travel control device 100 in one or more embodiments of the present invention, the higher the relative speed Vr of the subject vehicle V1 to the avoidance objects included in the avoidance object group is, the lateral position of the target route RT1 is planned at a further separate position from the avoidance object group. Therefore, the target route RT1 can be planned in accordance with the avoidance object of which the relative speed Vr is high and which is highly necessary to be avoided by the subject vehicle V1. Thus, the travel control for the subject vehicle V1 can be appropriately performed.

(11) According to the travel control device 100 in one or more embodiments of the present invention, an object area is set for the avoidance object group and a route for avoiding the object area is planned as the target route. Therefore, the avoidance object can be more appropriately avoided when performing travel control for the subject vehicle V1. Moreover, by planning a route for avoiding the object area as the target route, the size or the like of the object area set for the avoidance object group can be varied to allow the target route to be flexibly adjusted.

(12) According to the travel control device 100 in one or more embodiments of the present invention, information regarding the travel control for avoiding the avoidance objects and the avoidance object group is output to external, and the passengers in the subject vehicle and/or other vehicles can thereby be preliminarily informed of the behavior of the subject vehicle. This allows the passengers of the subject vehicle and/or other vehicles to respond to the behavior of the subject vehicle.

(13) When the travel control method according to one or more embodiments of the present invention is executed by the control device 10, the same action and effect can be obtained as in the above travel control device 100.

Embodiments heretofore explained are described to facilitate understanding of the present invention and are not described to limit the present invention. Therefore, it is intended that the elements disclosed in the above embodiments include all design changes and equivalents to fall within the technical scope of the present invention.

For example, in the present description, one or more embodiments of the travel control device according to the present invention are described by exemplifying the travel control device 100 which, together with the onboard apparatus 200, constitutes the travel control system 1, but the present invention is not limited to this.

In the above-described examples, when the subject vehicle V1 passes by avoidance objects (e.g. three other vehicles V4 to V6 illustrated in FIG. 3A) that exist ahead the subject vehicle V1, these avoidance objects are specified as an avoidance object group, but in one or more embodiments of the present invention, a plurality of avoidance objects approaching from behind the subject vehicle V1 may be specified as an avoidance object group. For example, in a scene in which three other vehicles are passing by the subject vehicle V1 from the backward right-side lane for the subject vehicle V1, the control device 10 may specify these other vehicles as an avoidance object group and plan a target route RT1 for avoiding the avoidance object group.

In the above-described examples, a method is exemplified in which the control device 10 of the travel control device 100 first specifies an avoidance object group on the basis of a plurality of avoidance objects and then plans a target route RT1 in accordance with the specified avoidance object group, but the method of planning the target route RT1 is not limited to such examples. For example, in one or more embodiments of the present invention, the control device 10 of the travel control device 100 may be configured to first plan a target route RT1 on the basis of individual avoidance objects, then specify those satisfying a predetermined condition among the individual avoidance objects as an avoidance object, and correct the planned target route RT1 in accordance with the specified avoidance object group.

In the present description, the travel control device 100 comprising the control device 10 which executes the object information acquisition function, object area setting function, route planning function and control function is described as one example of a travel control device comprising an information acquisition unit, planning unit, setting unit and control unit, but the present invention is not limited to this. In the present description, the travel control device 100 further comprising the output devices 30 and 110 is described as one example of a travel control device further comprising an output unit, but the present invention is not limited to this.

DESCRIPTION OF REFERENCE NUMERALS

1 Travel control system
100 Travel control device
10 Control device
20 Communication device
30 Output device
31 Display
32 Speaker
200 Onboard apparatus
40 Communication device
50 Detection device
60 Sensor
70 Vehicle controller
80 Driving device 90 Steering device
110 Output device
120 Navigation device

The invention claimed is:
1. A travel control device comprising:
an information acquisition unit configured to acquire object information including a position of an avoidance object to be avoided by a subject vehicle;
a planning unit configured to:
  specify, as an avoidance object group, a plurality of avoidance objects other than the subject vehicle that are located within a predetermined distance from the subject vehicle and exist in a same lane adjacent to a lane in which the subject vehicle travels;
  plan a target route for the subject vehicle in accordance with the position of the avoidance object so as to avoid the avoidance object and the avoidance object group; and
  set, when planning the target route, a lateral position of the target route along a width direction of a road on which the subject vehicle is traveling, the lateral position of the target route being planned so as to avoid the avoidance object group on a basis of the position of the avoidance object satisfying a predetermined condition among the avoidance objects which constitute the avoidance object group, and
a control unit configured to output command information for driving the subject vehicle on the target route.
2. The travel control device according to claim 1, wherein the planning unit specifies the plurality of avoidance objects of which relative speeds to the subject vehicle are within a predetermined range as the avoidance object group.
3. The travel control device according to claim 1, wherein the planning unit specifies the plurality of avoidance objects of which distances from adjacent avoidance objects are within a predetermined distance threshold as the avoidance object group.
4. The travel control device according to claim 1, wherein the planning unit specifies the avoidance objects of which distances between the avoidance objects and a lane marker along the width direction are within a predetermined range as the avoidance object group, and
the lane marker is one at a side of the subject vehicle among a pair of lane markers that define a lane in which the avoidance objects exist.
5. The travel control device according to claim 1, wherein the planning unit extracts avoidance objects each in order of distance from the subject vehicle along a travel direction of the subject vehicle and specifies, for extracted avoidance objects, respective avoidance object groups that each include the extracted avoidance objects.
6. The travel control device according to claim 1, wherein the planning unit specifies the avoidance object group such that a number of avoidance objects included in one avoidance object group is equal to or smaller than a predetermined number.
7. The travel control device according to claim 1, wherein the planning unit updates the specified avoidance object group in accordance with a travel distance or travel time of the subject vehicle.
8. The travel control device according to claim 1, wherein the planning unit sets the lateral position of the target route such that a distance between the target route and the avoidance object group in the width direction is longer as a position of the avoidance object in the width direction is closer to the subject vehicle, and
the avoidance object is closest to the subject vehicle along a travel direction of the subject vehicle among the plurality of avoidance objects included in the avoidance object group.
9. The travel control device according to claim 1, wherein the planning unit sets the lateral position of the target route such that a distance between the target route and the avoidance object group in the width direction is longer as a width of the avoidance object is wider, and
the avoidance object is closest to the subject vehicle along a travel direction of the subject vehicle among the plurality of avoidance objects included in the avoidance object group.
10. The travel control device according to claim 1, wherein the planning unit sets the lateral position of the target route such that a distance between the target route and the avoidance object group in the width direction is longer as a lane occupancy ratio of the avoidance object is higher, and
the avoidance object is closest to the subject vehicle along a travel direction of the subject vehicle among the plurality of avoidance objects included in the avoidance object group, wherein the lane occupancy ratio is defined as a ratio of a width of the avoidance object to a width of a lane in which the avoidance object exist.
11. The travel control device according to claim 1, wherein the planning unit sets the lateral position of the target route such that a distance between the target route and the avoidance object group in the width direction is longer as a position of the avoidance object in the width direction is closer to the subject vehicle, and
the avoidance object is closest to the subject vehicle along the width direction among the plurality of avoidance objects included in the avoidance object group.
12. The travel control device according to claim 1, wherein the planning unit sets the lateral position of the target route such that a distance between the target route and the avoidance object group in the width direction is longer as a relative speed of the subject vehicle to the avoidance objects included in the avoidance object group is higher.
13. The travel control device according to claim 1, further comprising a setting unit configured to set respective object areas based on positions of a plurality of avoidance object groups,
wherein the planning unit plans a route for avoiding the respective object areas as the target route.
14. The travel control device according to claim 1, further comprising an output unit configured to output, to external, one or more information items among information in accordance with the object information, information in accordance with a position of the avoidance object group, information in accordance with a location of the target route, and information in accordance with the command information for driving the subject vehicle on the target route.
15. A travel control method executed by a computer, the computer outputting command information for driving a subject vehicle on a target route, the travel control method comprising:

acquiring object information including a position of an avoidance object to be avoided by the subject vehicle; and specifying, as an avoidance object group, a plurality of avoidance objects other than the subject vehicle that are located within a predetermined distance from the subject vehicle and exist in a same lane adjacent to a lane in which the subject vehicle travels; and setting a lateral position of the target route along a width direction of a road on which the subject vehicle is traveling, the lateral position of the target route being planned so as to avoid the avoidance object group on a basis of the position of the avoidance object satisfying a predetermined condition among the avoidance objects which constitute the avoidance object group.

16. A travel control device comprising:

acquiring object information including a position of an avoidance object to be avoided by a subject vehicle;

specifying, as a plurality of avoidance object groups, a plurality of avoidance objects other than the subject vehicle that are located within a predetermined distance from the subject vehicle and exist in a same lane adjacent to a lane in which the subject vehicle travels;

setting respective object areas based on positions of a plurality of avoidance object groups;

planning a target route for the subject vehicle in accordance with the position of the avoidance object so as to avoid the avoidance object and the avoidance object group, wherein the target route avoids the respective object areas; and setting, when planning the target route, a lateral position of the target route along a width direction of a road on which the subject vehicle is traveling, the lateral position of the target route being planned so as to avoid the avoidance object group on a basis of the position of the avoidance object satisfying a predetermined condition among the avoidance objects which constitute the avoidance object group;

a control unit configured to output command information for driving the subject vehicle on the target route.

* * * * *